US009651850B2

(12) United States Patent
Chu et al.

(10) Patent No.: US 9,651,850 B2
(45) Date of Patent: May 16, 2017

(54) IMAGE PROCESSING SYSTEM AND METHOD FOR OBJECT TRACKING

(71) Applicants: Kevin Hwading Chu, Houston, TX (US); Xiran Wang, West Lafayette, IN (US); Yangyang Chen, Houston, TX (US)

(72) Inventors: Kevin Hwading Chu, Houston, TX (US); Xiran Wang, West Lafayette, IN (US); Yangyang Chen, Houston, TX (US)

(73) Assignee: Intellectual Fortress, LLC, Houston, TX (US)

(*) Notice: Subject to any disclaimer, the term of this patent is extended or adjusted under 35 U.S.C. 154(b) by 95 days.

(21) Appl. No.: 14/751,941

(22) Filed: Jun. 26, 2015

(65) Prior Publication Data

US 2016/0306264 A1 Oct. 20, 2016

Related U.S. Application Data

(63) Continuation-in-part of application No. 14/690,717, filed on Apr. 20, 2015, now Pat. No. 9,243,741, and (Continued)

(51) Int. Cl.
*B60R 1/02* (2006.01)
*G03B 17/56* (2006.01)
(Continued)

(52) U.S. Cl.
CPC ......... *G03B 17/565* (2013.01); *F16M 11/041* (2013.01); *F16M 11/14* (2013.01);
(Continued)

(58) Field of Classification Search
CPC .... G03B 17/565; G03B 17/563; F16M 13/00; F16M 11/28; F16M 11/041; F16M 11/14;
(Continued)

(56) References Cited

U.S. PATENT DOCUMENTS

| 4,530,580 A | 7/1985 | Ueda et al. |
| 6,220,556 B1 | 4/2001 | Sohrt et al. |

(Continued)

FOREIGN PATENT DOCUMENTS

WO 9501531 A1 1/1995

OTHER PUBLICATIONS

Notice of Allowance Issued in Related U.S. Appl. No. 14/690,717, Mailed Dec. 3, 2015 (16 pages).

*Primary Examiner* — Roberto Velez
*Assistant Examiner* — Tuan Le

(57) ABSTRACT

A telescoping monopod apparatus including a holder configured to hold an image acquisition module having a field of vision, and a support holding a mirror to be in proximity to a lens of the image acquisition module, the mirror is configured to enable the image acquisition module to capture an image outside the field of vision, and a body housing a control component and an electronic component configured to actuate the telescoping monopod apparatus and the support. The body is operatively connected to the holder. A tracking method including receiving an input from a user, detecting, by an image acquisition module, a feature, and adjusting a mirror to track the feature.

7 Claims, 18 Drawing Sheets

Related U.S. Application Data a continuation-in-part of application No. 14/714,349, filed on May 18, 2015.

(60) Provisional application No. 62/172,952, filed on Jun. 9, 2015.

(51) Int. Cl.
| | |
|---|---|
| *H04N 5/225* | (2006.01) |
| *H04N 5/232* | (2006.01) |
| *F16M 11/04* | (2006.01) |
| *F16M 11/14* | (2006.01) |
| *F16M 11/18* | (2006.01) |
| *F16M 11/20* | (2006.01) |
| *F16M 11/28* | (2006.01) |
| *F16M 13/00* | (2006.01) |
| *F16M 13/04* | (2006.01) |
| *F16M 13/06* | (2006.01) |
| *F16M 13/08* | (2006.01) |
| *G02B 26/08* | (2006.01) |

(52) U.S. Cl.
CPC ......... *F16M 11/18* (2013.01); *F16M 11/2014* (2013.01); *F16M 11/28* (2013.01); *F16M 13/00* (2013.01); *F16M 13/04* (2013.01); *F16M 13/06* (2013.01); *F16M 13/08* (2013.01); *G02B 26/08* (2013.01); *G03B 17/561* (2013.01); *G03B 17/563* (2013.01); *H04N 5/232* (2013.01); *H04N 5/23219* (2013.01); *H04N 5/23296* (2013.01); *H04N 5/2251* (2013.01)

(58) Field of Classification Search
CPC .... F16M 11/18; F16M 11/2014; F16M 13/04; F16M 13/06; F16M 13/08; H04N 5/23219; H04N 5/232; H04N 5/23296; G02B 26/08
See application file for complete search history.

(56) References Cited

U.S. PATENT DOCUMENTS

| | | | |
|---|---|---|---|
| 6,350,037 B1 * | 2/2002 | Adams | B60R 1/025 307/10.2 |
| 6,357,884 B1 * | 3/2002 | Lonergan | G03B 17/565 359/860 |
| 6,384,863 B1 | 5/2002 | Bronson | |
| 6,580,992 B2 * | 6/2003 | Whitten | B60R 1/025 359/877 |
| 6,769,824 B2 | 8/2004 | Nakatani | |
| 6,809,704 B2 * | 10/2004 | Kulas | B60K 35/00 340/937 |
| D511,352 S | 11/2005 | Oliver et al. | |
| 7,199,832 B2 | 4/2007 | Oran | |
| 7,217,044 B1 | 5/2007 | Marks, Jr. | |
| 7,373,249 B2 * | 5/2008 | Ivanov | B60R 1/025 340/556 |
| 7,540,459 B2 | 6/2009 | Asano et al. | |
| 7,706,673 B1 | 4/2010 | Staudinger et al. | |
| 8,002,480 B2 | 8/2011 | Polster | |
| 2002/0141812 A1 | 10/2002 | Edelen et al. | |
| 2004/0118985 A1 | 6/2004 | Omps | |
| 2005/0092878 A1 | 5/2005 | Murray et al. | |
| 2006/0155444 A1 * | 7/2006 | Lee | B60R 1/025 701/49 |
| 2006/0167606 A1 * | 7/2006 | Malhas | B60R 1/025 701/49 |
| 2006/0178787 A1 * | 8/2006 | McCall | B60R 1/002 701/1 |
| 2006/0257137 A1 | 11/2006 | Fromm | |
| 2008/0117328 A1 | 5/2008 | Daoud et al. | |
| 2008/0225131 A1 * | 9/2008 | Aoki | G06T 7/73 348/222.1 |
| 2009/0003822 A1 | 1/2009 | Tyner | |
| 2009/0136290 A1 | 5/2009 | Persson | |
| 2010/0017071 A1 * | 1/2010 | Ryu | B60R 1/02 701/49 |
| 2010/0200710 A1 | 8/2010 | Shenouda | |
| 2010/0226531 A1 * | 9/2010 | Goto | G06T 11/00 382/103 |
| 2010/0328420 A1 * | 12/2010 | Roman | H04N 5/2251 348/14.08 |
| 2012/0022749 A1 * | 1/2012 | Clegg | B60R 1/025 701/49 |
| 2013/0176412 A1 | 7/2013 | Chen | |
| 2013/0250130 A1 | 9/2013 | Roshanravan | |
| 2014/0209777 A1 | 7/2014 | Klemin et al. | |
| 2014/0313358 A1 | 10/2014 | Yu | |
| 2015/0077630 A1 | 3/2015 | Miller | |

* cited by examiner

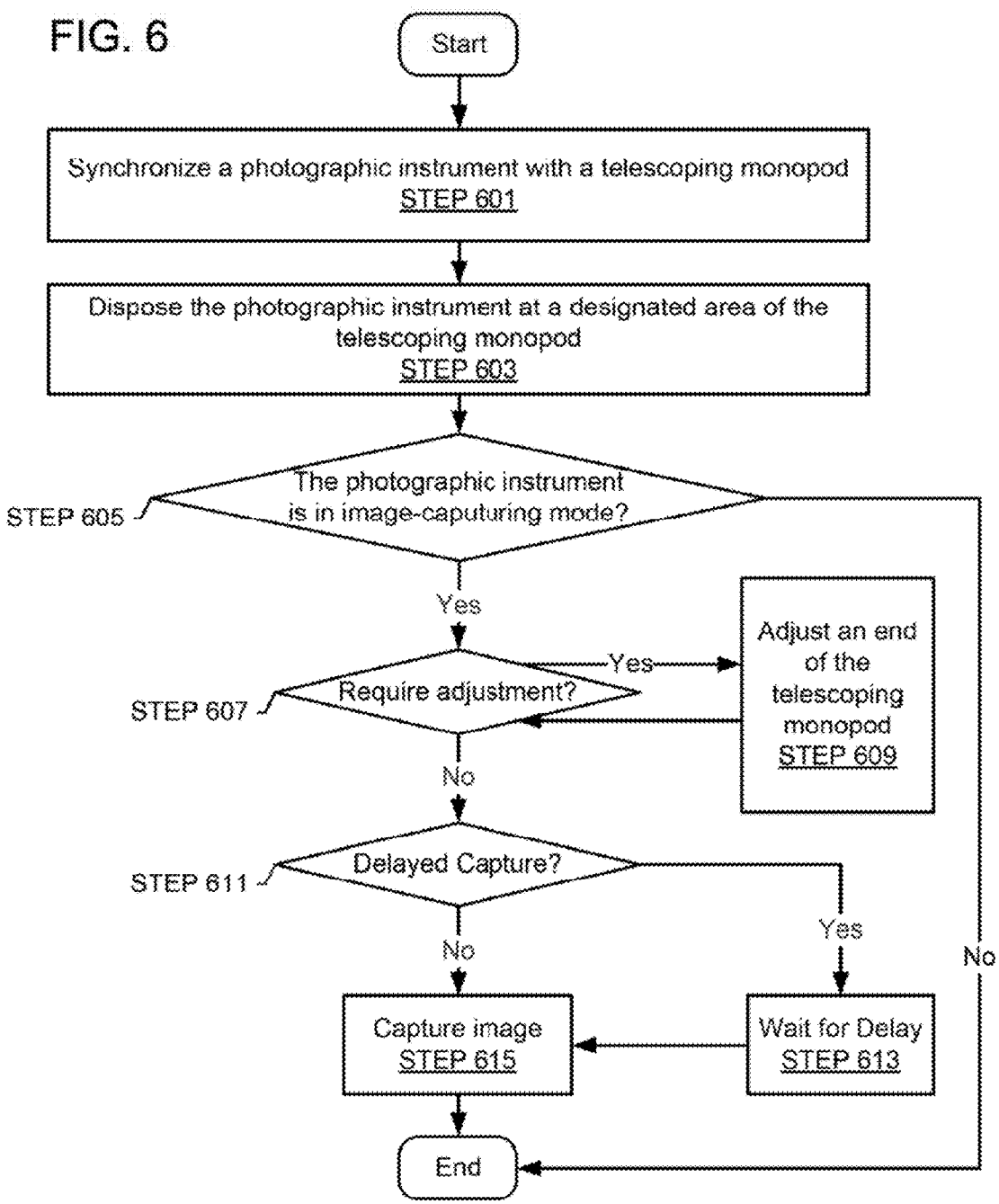

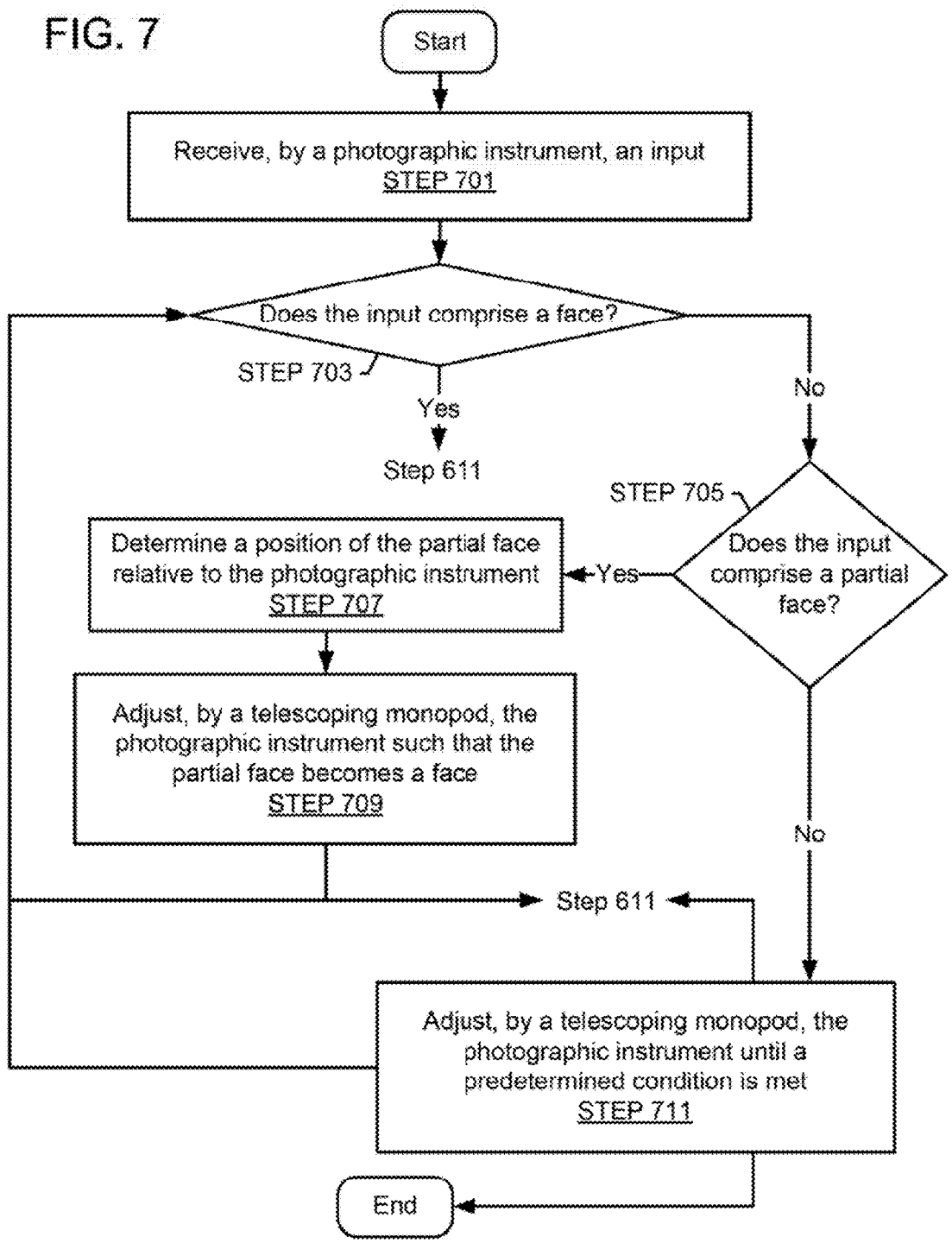

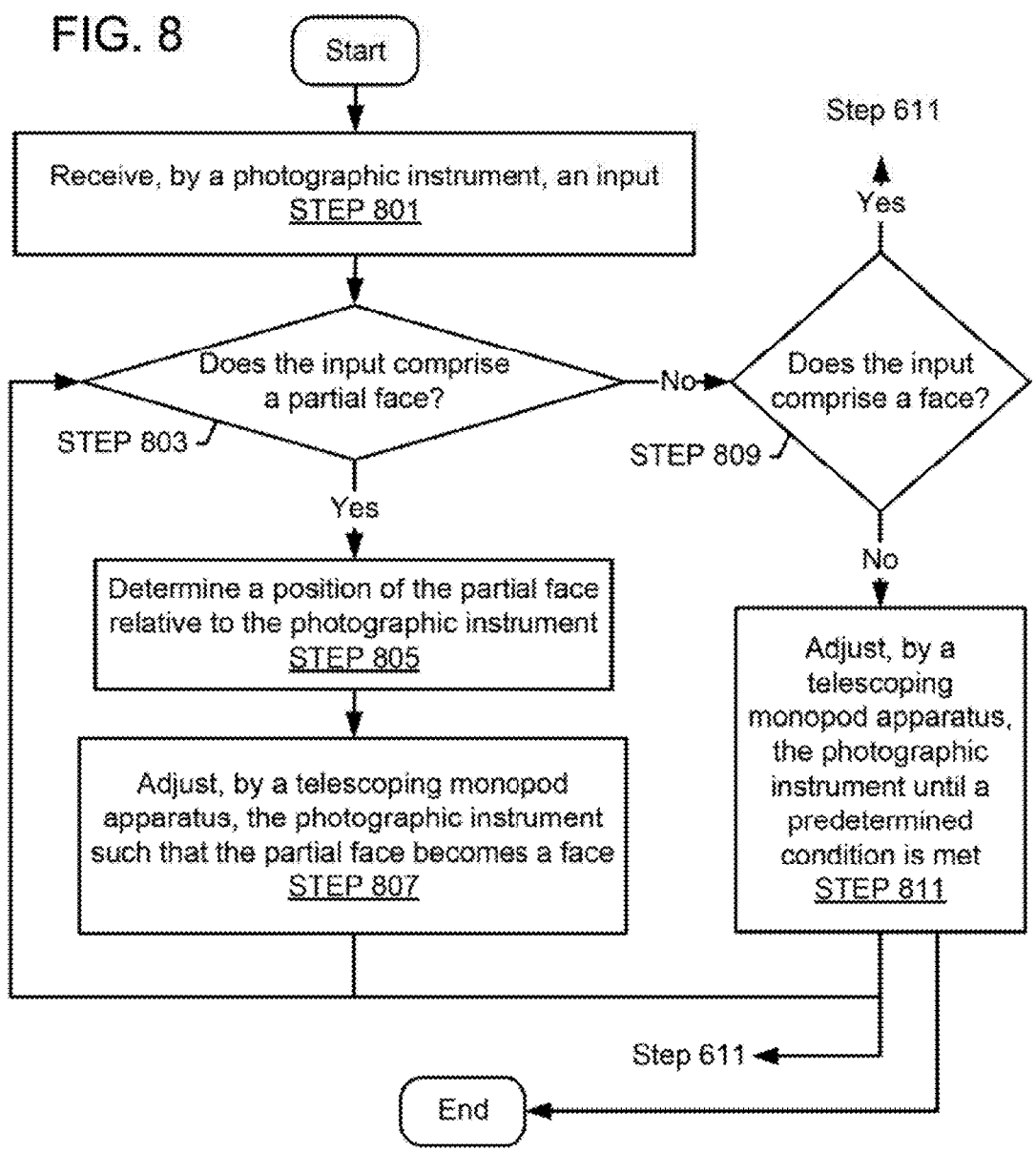

IMAGE PROCESSING SYSTEM AND METHOD FOR OBJECT TRACKING

CROSS-REFERENCE TO RELATED APPLICATIONS

This application claims priority under 35 U.S.C. §120 as a continuation-in-part of U.S. patent application Ser. No. 14/690,717, filed on Apr. 20, 2015. This application claims priority under 35 U.S.C. §120 as a continuation-in-part of U.S. patent application Ser. No. 14/714,349, filed on May 18, 2015. This application also claims priority under 35 U.S.C. §119(e) to U.S. Provisional Patent Application No. 62/172,952, filed Jun. 9, 2015. The priority applications are hereby incorporated by reference in their entirety.

RESERVATION OF COPYRIGHTS

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

U.S. patent application Ser. No. 14/690,717 describes a telescoping monopod apparatus that enables a user to capture selfie photographs by positioning an image acquisition module, e.g., smartphone, camera, etc., beyond a normal range of an arm of the user.

U.S. patent application Ser. No. 14/690,717 also describes using mirrors in conjunction with the image acquisition module and the telescoping monopod apparatus. The mirrors are actuated by shafts, supports, etc., to track a feature, which may be a face.

U.S. patent application Ser. No. 14/714,349 describes an image acquisition and feature extraction apparatus and a method of feature extraction and feature identification.

This application further describes the various applications of an image processing system and method for object tracking. The image processing system and method for object tracking may comprise a mirror tracking system as described in U.S. patent application Ser. No. 14/690,717; the image processing system and method may also be combined with the method of feature extraction and feature identification as described in U.S. patent application Ser. No. 14/714,349.

SUMMARY

In general, in one aspect, one or more embodiments disclosed herein relate to a telescoping monopod apparatus comprising: a holder configured to hold an image acquisition module having a field of vision, and a support holding a mirror to be in proximity to a lens of the image acquisition module, the mirror is configured to enable the image acquisition module to capture an image outside the field of vision; and a body housing a control component and an electronic component configured to actuate the telescoping monopod apparatus and the support, wherein the body is operatively connected to the holder.

In another aspect, one or more embodiments disclosed herein relate to a tracking method comprising: receiving an input from a user; detecting, by an image acquisition module, a feature; and adjusting a mirror to track the feature.

In yet another aspect, one or more embodiments disclosed herein relate to a method for capturing an image, the method comprising: synchronizing an image acquisition module with a tracking system having a mirror and an end; disposing the image acquisition module in a holder of the tracking system, the holder is attached to the end; determining that the image acquisition module is in an image-capturing mode; extracting, by the image-capturing mode, a feature; detecting that the feature comprises a cutoff; adjusting the mirror such that the extracted feature does not comprise the cutoff; and capturing an adjusted image.

Other aspects and advantages of the disclosure will be apparent from the following description and the appended claims.

BRIEF DESCRIPTION OF DRAWINGS

FIG. 6 shows a method for using a telescoping monopod apparatus in conjunction with a photographic instrument to capture an image according to one or more embodiments.

FIG. 7 shows a method for face detection and recognition and for adjusting a telescoping monopod apparatus in Euclidean space according to the face detection and recognition according to one or more embodiments.

FIG. 8 shows a method for face detection and recognition and for adjusting a telescoping monopod apparatus in Euclidean space according to the face detection and recognition according to one or more embodiments.

DETAILED DESCRIPTION

Figures 1A, 1B:
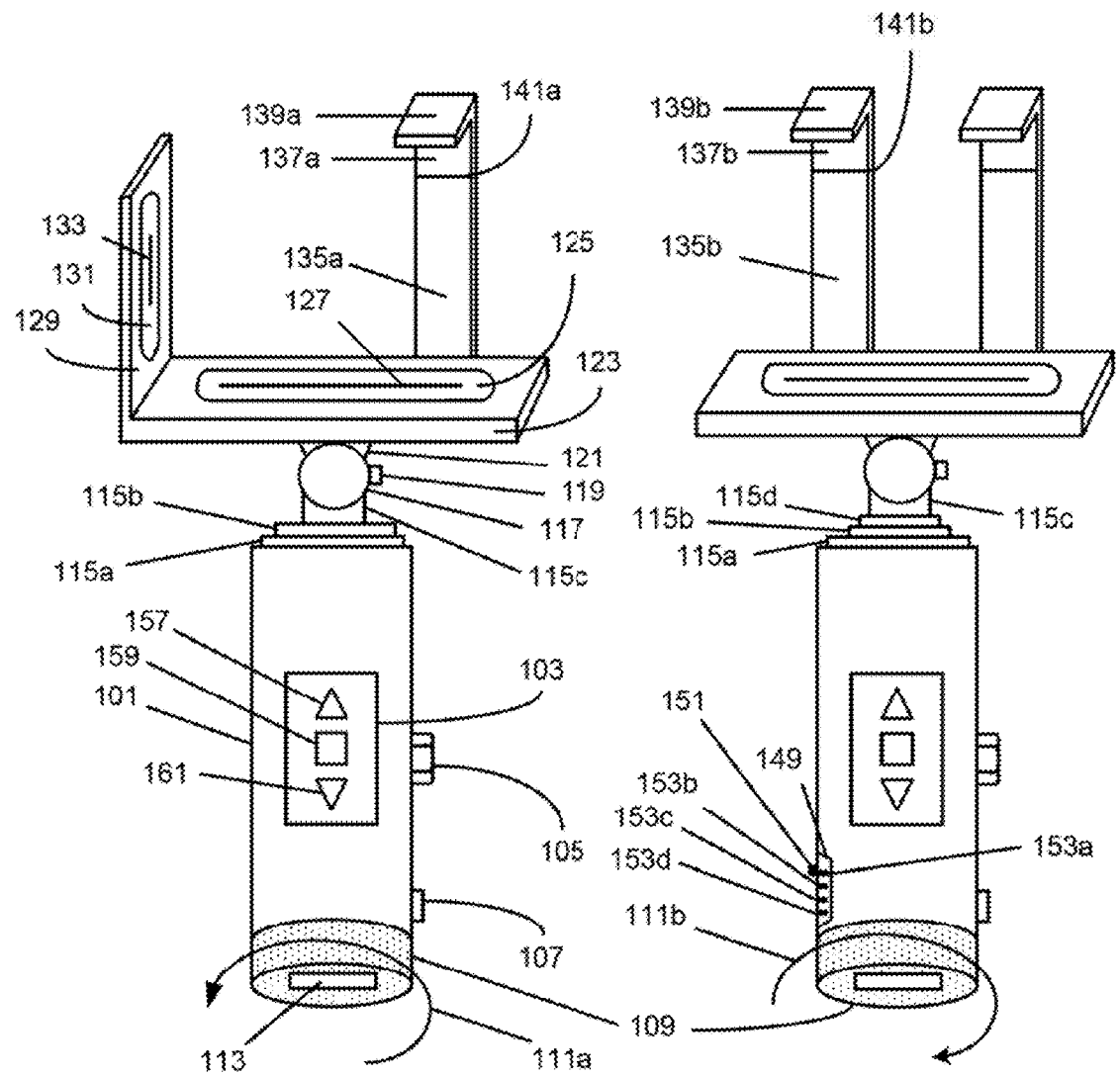
FIG. 1A shows a telescoping monopod apparatus according to one or more embodiments.
FIG. 1B shows a telescoping monopod apparatus according to one or more embodiments.

Specific embodiments will now be described in detail with reference to the accompanying figures. Like elements in the various figures are denoted by like reference numerals for consistency. Like elements may not be labelled in all figures for the sake of simplicity.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create a particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The terms and words used in the following disclosure and claims are not limited to the bibliographical meanings, but, are merely used by the inventor to enable a clear and consistent understanding of one or more embodiments of the present invention. Accordingly, it should be apparent to those skilled in the art that the following description of one or more embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the terms "substantially," "approximately," "in proximity to," etc., the Applicant means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

In general, one or more embodiments of the present invention relate to a telescoping monopod apparatus. In general, one or more embodiments of the present invention relate to a tracking method. In general, one or more embodiments of the present invention relate to a method for capturing an image.

FIG. 1A shows a telescoping monopod apparatus according to one or more embodiments. The telescoping monopod apparatus may be between 20 cm and 100 cm in length. The weight of the telescoping monopod apparatus may vary from one embodiment to another, depending on the composition of the material of the various components. The body (101) may be made with aluminum, or any other durable material that can withstand water and rust. Components other than the body (101) may be made with aluminum, plastic, or any other durable material that can withstand water and rust. FIG. 1A also shows a holder comprising a spheroidal joint (121), a base (123) having a pad (125) having a groove (127), a side wall (129) having a pad (131) having a groove (133), a holding claw (135a), a moveable portion (137a), a retainer (139a), and a spring (141a).

As shown in FIG. 1A, the telescoping monopod apparatus has multiple components including a body (101), a control panel (103), an adjustment knob (105), a power switch (107), a rotatable bottom end (109), a crevasse (113), a plurality of shafts (a first shaft (115a), a second shaft (115b), and a third shaft (115c)), a ball (117), a position fixing knob (119), a spheroidal joint (121), a base (123) having a pad (125) having a groove (127), a side wall (129) having a pad (131) having a groove (133), a holding claw (135a), a moveable portion (137a), a retainer (139a), and a spring (141a). As also shown in FIG. 1A, various components of the telescoping monopod apparatus may be connected directly or indirectly with one another. Each of these components, along with their functions and interactions with other components, is described below.

In one or more embodiments, the body (101) may house an electronic component and a control component. In one or more embodiments, the body (101) may comprise the control panel (103), the adjustment knob (105), the power switch (107), and the rotatable bottom end (109). The plurality of shafts (the first shaft (115a), the second shaft (115b), and the third shaft (115c)) may be disposed in an interior of the body (101) from an upper end of the body (101), the upper end may be an opposite end of the rotatable bottom end (109). The body (101) may be between 10 cm and 20 cm.

Although the body (101) has been described to comprise certain components, the disclosure is not limited thereto. For example, in one or more embodiments, the body (101) may further comprise a grip, a handle, a cap, etc., so that the telescoping monopod apparatus may be used as a staff. In one or more embodiments, the grip, the handle, the cap, etc., may be capped around the rotatable bottom end (109) so that the crevasse (113) is sealed and protected from water, dust, etc. This may be advantageous for mountaineers and users participating in certain sports that would otherwise require a separate staff. For example, in one or more embodiments, the body (101) may be wrapped with any material (e.g., silicone compositions) that may help improve grip.

In one or more embodiments, the control panel (103) may comprise an up arrow button (157), a square adjust-and-capture button (159), and a down arrow button (161). The control panel (103) and the body (101) may be monolithic. In one or more embodiments, the control panel (103) may comprise an additional housing. The control panel (103) is explained in more details in reference to FIGS. 2-4C.

In one or more embodiments, the adjustment knob (105) may be operatively connected to the body (101). The adjustment knob (105) may be a gear piece, a toggle, a flip, or any other component that may be configured to be in a plurality of states. The adjustment knob may be made from aluminum, or from any other durable material that can withstand water and rust.

In one or more embodiments, the adjustment knob (105) may be a part of the control component and/or the electrical component. The adjustment knob (105) may be turned in a counterclockwise direction (111a) or may be turned in a clockwise direction (111b) relative to an axis of the adjustment knob (105).

In one or more embodiments, when turned in the clockwise direction (111b), the adjustment knob (105) may increase a distance between the rotatable bottom end (109) and an upper end of the third shaft (115c) as the clockwise motion may actuate the control component housed by the body (101).

In one or more embodiments, when turned in the counterclockwise direction (111a), the adjustment knob (105) may decrease the distance between the rotatable bottom end (109) and the upper end of the third shaft (115c) as the counterclockwise motion may actuate the control component housed by the body (101).

In one or more embodiments, the power switch (107) may be operatively connected to the body (101). The power switch (107) may be a part of the control component and/or the electrical component. The power switch (107) may be configured to turn the telescoping monopod apparatus to an on-state or to an off-state.

Although FIG. 1 shows the power switch (107) to be a button, the present disclosure is not limited thereto. For example, the power switch (107) may be embedded in the body (101). For example, the power switch (107) may be a motion sensor. For example, the power switch (107) may be a conductive plate having a conductive film.

In one or more embodiments, the rotatable bottom end (109) may be operatively connected to the body (101). The rotatable bottom end (109) may be a part of the control component and/or the electrical component. The rotatable bottom end (109) may be turned in a clockwise direction (111b) relative to a center axis of the body (101) or may be turned in a counterclockwise direction (111a) relative to the center axis of the body (101).

In one or more embodiments, when turned in the clockwise direction (111b), the rotatable bottom end (109) may increase a distance between the rotatable bottom end (109) and an upper end of the third shaft (115c) as the clockwise motion may actuate the control component housed by the body (101).

In one or more embodiments, when turned in the counterclockwise direction (111a), the rotatable bottom end (109) may decrease a distance between the rotatable bottom end (109) and the upper end of the third shaft (115c) as the counterclockwise motion may actuate the control component housed by the body (101).

In one or more embodiments, when turned in the clockwise direction (111b), the holder may roll/rotate in the clockwise direction (111b).

In one or more embodiments, when turned in the counterclockwise direction (111a), the holder may roll/rotate in the counterclockwise direction (111a).

In one or more embodiments, the rotatable bottom end (109) may be made of a translucent or a transparent material. In one or more embodiments, a light source (e.g., a light-emitting diode) may be disposed in the rotatable bottom end (109) so that a user of the telescoping monopod apparatus may use the rotatable bottom end (109) as a flashlight.

In one or more embodiments, the rotatable bottom end (109) may comprise the crevasse (113) configured to receive an insert of an electronic device. In one or more embodiments, the rotatable bottom end (109) may be configured to receive, via the crevasse (113), a universal serial bus (USB). In one or more embodiments, the rotatable bottom (109) may be configured to receive a grip, a handle, a cap, etc., to seal the crevasse (113) from water, dust, etc.

In one or more embodiments, the plurality of shafts (the first shaft (115a), the second shaft (115b), and the third shaft (115c)) may be disposed in an interior of the body (101) from an upper end of the body (101). In one or more embodiments, each of the plurality of shafts may or may not have the same length as another shaft. In one or more embodiments, the plurality of shafts may be between 20 cm and 80 cm. In one or more embodiments, the plurality of shafts may be concentric to one another and/or may be concentric to the body (101). In one or more embodiments, the plurality of shafts may be fixed to one another concentrically by sharing an indented track. In one or more embodiments, the plurality of shafts may be made from aluminum, or from any other durable material that can withstand water and rust.

In one or more embodiments, when tuning the rotatable bottom end (109) in the clockwise direction (111b), the plurality of shafts (the first shaft (115a), the second shaft (115b), and the third shaft (115c)) may also rotate the holder in the clockwise direction (111b). In one or more embodiments, the body (101) may rotate in the clockwise direction (111b) when the plurality of shafts (the first shaft (115a), the second shaft (115b), and the third shaft (115c)) rotate in the clockwise direction (111b)).

In one or more embodiments, when turning the rotatable bottom end (109) in the counterclockwise direction (111a), the plurality of shafts (the first shaft (115a), the second shaft (115b), and the third shaft (115c)) may also rotate the holder in the counterclockwise direction (111b). In one or more embodiments, the body (101) may also rotate in the counterclockwise direction (111a) when the plurality of shafts (the first shaft (115a), the second shaft (115b), and the third shaft (115c)) rotate in the clockwise direction (111b)).

In one or more embodiments, the ball (117) having a first end and a second end may be operatively connected to the upper end of the third shaft (115c) using the first end. In one or more embodiments, the ball (117) may be operatively connected to the spheroidal joint (121) using the second end. In one or more embodiments, the ball (117) may have protrusions spread equidistant from one another across the ball (117) to provide traction between the ball (117) and the spheroidal joint (121). In one or more embodiments, the spheroidal joint (121) may subject the ball (117) to two degrees of freedom. In one or more embodiments, the spheroidal joint (121) may subject the ball (117) to a spherical coverage. That is, the ball (117) may move in any direction with respect to the spheroidal joint (121). In one or more embodiments, the spheroidal joint (121) may subject the ball (117) to three degrees of freedom (i.e., pan, tilt, and roll). In one or more embodiments, degrees of freedom greater than three may be possible with the use of at least two balls and/or other actuating components. In one or more embodiments, the ball (117) may contact the actuator of the control component and be subject to rotation in a horizontal plane and/or rotational in a vertical plane. That is, the ball (117) may be utilized such that the holder may be panned and tilted. In one or more embodiments, the holder connected to the ball (117) may have a pan range of +/−170 degrees and a tilt range of +1-90 degrees. In one or more embodiments, the holder connected to the ball (117) may have a pan range of +/−180 degrees and a tilt range of +/−180 degrees. In one or more embodiments, the holder connected to the ball (117) may roll. The ranges are determined by the physical limits of the various cables and actuators of the control component. One of ordinary skill in the art would recognize that the terms "pan," "tilt", and "roll" may be substituted by other equivalent terms. That is, one of ordinary skill in the art would be able to describe the orientation of the holder and the ball using Euler angles, other coordinate systems, and/or any markers that describe a Euclidean space.

In one or more embodiments, the position fixing knob (119) may be operatively connected to the ball (117) and may fix a position of the ball, and hence configured to fix the position of the holder (if a holder is attached to the ball (117)), relative to the body (101). In one or more embodiments, the position fixing knob (119) may be configured to a fix a position of the ball relative to the spheroidal joint (121). In one or more embodiments, the position fixing knob may be absent or not utilized if the ball (117) is allowed to rotate, thereby enabling the holder to pan and tilt relative to the body (101).

In one or more embodiments, the base (123) may have an upper face and a lower face. The upper face comprises the pad (125) having the groove (127). The base (123) may comprise the side wall (129) having the pad (131) having the groove (133). The base (123) may comprise the holding claw (137a).

In one or more embodiments, the pads (125, 131) may be made from a material that can secure the photographic instrument in the holder without causing scratches or damages to the photographic instrument. For example, the pads (125, 131) may be made from foam, rubber, silicone compositions, etc.

In one or more embodiments, the pads (125, 131) may comprise a groove (127, 133) configured to better secure the photographic instrument when the photographic instrument is disposed in the holder. The grooves (127, 133), the pads (125, 131), and the dimension and shape of the holder are not limited so long as the photographic instrument can be properly secured to the holder of the telescoping monopod apparatus. One of ordinary skill in the art would appreciate that because photographic instruments come in all sizes, shapes, and forms that the holder of the disclosed telescoping monopod apparatus may be modified as necessary to adequately secure the disposed photographic instrument. For example, a length of the base (123) may be modified depending on a height of the photographic instrument. For example, a length of the side wall (129) may be modified depending on a width of the photographic instrument. For example, a height of the holding claw (137a) and the retainer (139a) may be modified depending on a length of the photographic instrument. For example, two side walls may be utilized by the holder to hold the photographic instrument without the holding claw (137a), the moveable portion (139a), and the spring (141a).

In one or more embodiments, the holding claw (135a) may be disposed on a backside of the base (123). In one or more embodiments, the holding claw (135a) may comprise the moveable portion (137a), the retainer (139a), and the spring (141a). In the event that the length of the photographic instrument exceeds the height of the holding claw (135a) the moveable portion (137a) may extend in height to accommodate the additional length of the photographic instrument. The moveable portion (137a) may be extended by the spring (141a). The disclosure, however, is not limited thereto. For example, in the event that the length of the photographic instrument is less than the height of the holding claw (135a), the holding claw (135a) may be collapsed to accommodate the shorter length of the photographic instrument. The holding claw (135a) may be collapsed using any method. For example, the holding claw (135a) may comprise a plurality of portions wrapped concentrically to one another and change length using an indented track. In one or more embodiments, the holding claw (135a) may be adjustable (i.e., moveable in a direction parallel to the length of the holder). In one or more embodiments, the holding claw (135a) may be a flap, a clip, a pocket, etc. The flap, the clip, the pocket, etc., may be implemented in combination with any known fastener. For example, the pocket may be attached to the side wall (129) and may be configured to hold the photographic instrument by sealing the photographic instrument in the pocket using Velcro®.

FIG. 1B shows a telescoping monopod apparatus according to one or more embodiments. FIG. 1B shows a telescoping monopod apparatus that is substantially similar to the one shown in FIG. 1A. As discussed above, like elements in the various figures are denoted by like reference numerals for consistency. Like elements may not be labelled in all figures for the sake of simplicity. Further, explanations of components that have already been described will be omitted for the sake of brevity.

FIG. 1B shows a plurality of shafts (the first shaft (115a), the second shaft (115b), the third shaft (115c), and the fourth shaft (115d)). The plurality of shafts is disposed in an interior of the body (101) from an upper end of the body (101), the upper end is an opposite end of a rotatable bottom end (109). One of ordinary skill in the art would appreciate that the number of shafts of the plurality of shafts may vary depending on manufacturing factors and consumer demands.

In one or more embodiments, the body (101) may comprise a timer (149) having a toggle (151). The toggle (151) of the timer (149) may be configured to interlock with one of a plurality of gaps (first gap (153a), second gap (153b), third gap (153c), and fourth gap (153d)). Each of the plurality of the gaps (first gap (153a), second gap (153b), third gap (153c), and fourth gap (153d)) sets a predetermined delay time to the photographic instrument placed in the holder. For example, the first gap (153a) may subject whichever photographic instrument that is synchronized with the telescoping monopod apparatus to no time delay when capturing an image upon receiving a user input to capture the image. For example, the second gap (153b) may subject whichever photographic instrument that is synchronized with the telescoping monopod apparatus to a delay of one second when capturing an image upon receiving a user input to capture the image. For example, the third gap (153c) may subject whichever photographic instrument that is synchronized with the telescoping monopod apparatus to a delay of two seconds when capturing an image upon receiving a user input to capture the image. For example, the fourth gap (153d) may subject whichever photographic instrument that is synchronized with the telescoping monopod apparatus to a delay of three seconds when capturing an image upon receiving a user input to capture the image. The synchronizing of the telescoping monopod apparatus and the photographic instrument is described in more details in reference to FIG. 6.

In one or more embodiments, the holding claw (135a) may be disposed on a backside of the base (123). In one or more embodiments, the holding claw (135a) may comprise the moveable portion (137a), the retainer (139a), and the spring (141a). In the event that the length of the photographic instrument exceeds the height of the holding claw (135a) the moveable portion (137a) may extend in height to accommodate the additional length of the photographic instrument. The moveable portion (137a) may be extended by the spring (141a). The disclosure, however, is not limited thereto. For example, in the event that the length of the photographic instrument is less than the height of the holding claw (135a), the holding claw (135a) may be collapsed to accommodate the shorter length of the photographic instrument. The holding claw (135a) may be collapsed using any method. For example, the holding claw (135a) may comprise a plurality of portions wrapped concentrically to one another and change length using an indented track. In one or more embodiments, the holding claw (135a) may be adjustable (i.e., moveable in a direction parallel to the length of the holder). In one or more embodiments, the holding claw (135a) may be a flap, a clip, a pocket, etc. The flap, the clip, the pocket, etc., may be implemented in combination with any known fastener. For example, the pocket may be attached to the side wall (129) and may be configured to hold the photographic instrument by sealing the photographic instrument in the pocket using Velcro®.

In one or more embodiments, a plurality of holding claws (135a, 135b) may be disposed on the backside of the base (123). In one or more embodiments, each of the holding claws (135a, 135b) may comprise the moveable portion (137a, 137b), the retainer (139a, 139b), and the spring (141a, 141b). In the event that the length of the photographic instrument exceeds the height of the holding claws (135a, 135b) the moveable portions (137a, 137b) may extend in height to accommodate the additional length of the photographic instrument. The moveable portions (137a, 137b) may be extended by the spring (141a, 141b). The invention, however, is not limited thereto. For example, in the event that the length of the photographic instrument is less than the height of the holding claws (135a, 135b), the holding claws (135a, 135b) may be collapsed to accommodate the shorter length of the photographic instrument. The holding claws (135a, 135b) may be collapsed using any method. For example, the holding claws (135a, 135b) may each comprise a plurality of portions wrapped concentrically to one another and change length using an indented track. In one or more embodiments, the holding claws (135a, 135b) may be adjustable (i.e., moveable in a direction parallel to the length of the holder). In one or more embodiments, the holding claw (135a, 135b) may be a flap, a clip, a pocket, etc. The flap, the clip, the pocket, etc., may be implemented in combination with any known fastener. For example, the pocket may be attached to a side wall (129) and may be configured to hold the photographic instrument by sealing the photographic instrument in the pocket using Velcro®. In one or more embodiments, the plurality of holding claws (135a, 135b) may be positioned on the backside of the base (123) without the side wall (129). While FIG. 1B only illustrates the plurality of holding claws (135a, 135b) as having two claws, one of ordinary skill in the art would appreciate that any number of holding claws may be utilized. Further, the side wall (129) of FIG. 1A may also be replaced or used in combination with a holding claw. In one or more embodiments, the moveable portions (137a, 137b) may be extended in height by methods other than the springs (141a, 141b). For example, gears, belts, tracks, slides, protrusions, or any known actuating methods may be utilized in place of or in combination with the spring.

Figure 1C:
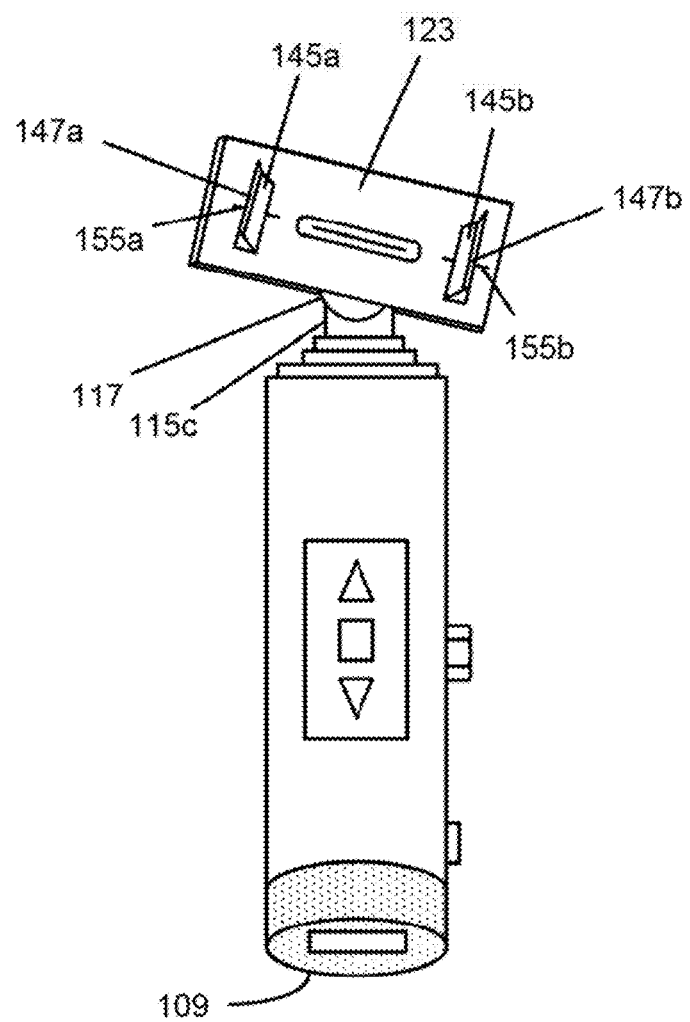
FIG. 1C shows a telescoping monopod apparatus according to one or more embodiments.

FIG. 1C shows a telescoping monopod apparatus according to one or more embodiments. FIG. 1C shows a telescoping monopod apparatus that is substantially similar to the one shown in FIG. 1A and the one shown in FIG. 1B. As discussed above, like elements in the various figures are denoted by like reference numerals for consistency. Like elements may not be labelled in all figures for the sake of simplicity. Further, explanations of components that have already been described will be omitted for the sake of brevity.

In one or more embodiments, a base (123) having an upper face and a lower face may be provided. The upper face of the base (123) may comprise the pad (125) having the groove (127). Two walls (145a, 145b) may be provided on the upper face to surround the pad (125) from two opposing directions. Each of the two walls (145a, 145b) may be restrained and configured to move by a spring (155a, 155b). The moving need not be performed by the spring (155a, 155b). One of ordinary skill in the art would appreciate that the moving may be accomplished by gears, combination of protrusions and indented tracks, etc. The two walls (145a, 145b) may clamp onto the photographic instrument the same way the holding claw (137a) does. In one or more embodiments, a retaining portion (147a, 147b) may be provided on each of the walls (145a, 145b) to provide more traction between the wall and the photographic instrument. In one or more embodiments, the retaining portion (147a, 147b) may be made from any material (e.g., foam, rubber, etc.) that can contact the photographic instrument without causing damage to the photographic instrument.

In one or more embodiments, the ball (117) may directly contact the lower face of the base (123) without the spheroidal joint (121). In one or more embodiments, a hole exists in the lower face of the base (123). The hole may serve, in place of the spheroidal joint (121), the function of retaining the ball.

In one or more embodiments, two pairs of the two walls (145a, 145b) may be provided to surround the pad (125). That is, four walls may be provided to surround the pad (125) and hold onto the photographic instrument. In one or more embodiments, one of the two pairs of the two walls (145a, 145b) may surround the pad (125) in a vertical direction. In one or more embodiments, the other of the two pairs of the two walls (145a, 145b) may surround the pad (125) in a horizontal direction. The four walls may each comprise its own movement mechanism, e.g., a spring. In one or more embodiments, a pair of the two walls may share an indented track coupled with a spring. In one or more embodiments, additional walls may be provided to secure the photographic instrument to the telescoping monopod apparatus.

FIG. 1C shows a telescoping monopod apparatus according to one or more embodiments. Explanations of components that have already been described will be omitted for the sake of brevity. FIG. 1C shows the ball (117) directly contacting the lower face of the base (123). In this example, the adjustment knob is absent so as to enable the combination of the ball (117) and the holder to pan, tilt, and roll. FIG. 1C shows the holder to be rolled, but not panned or tilted.

Figure 2:
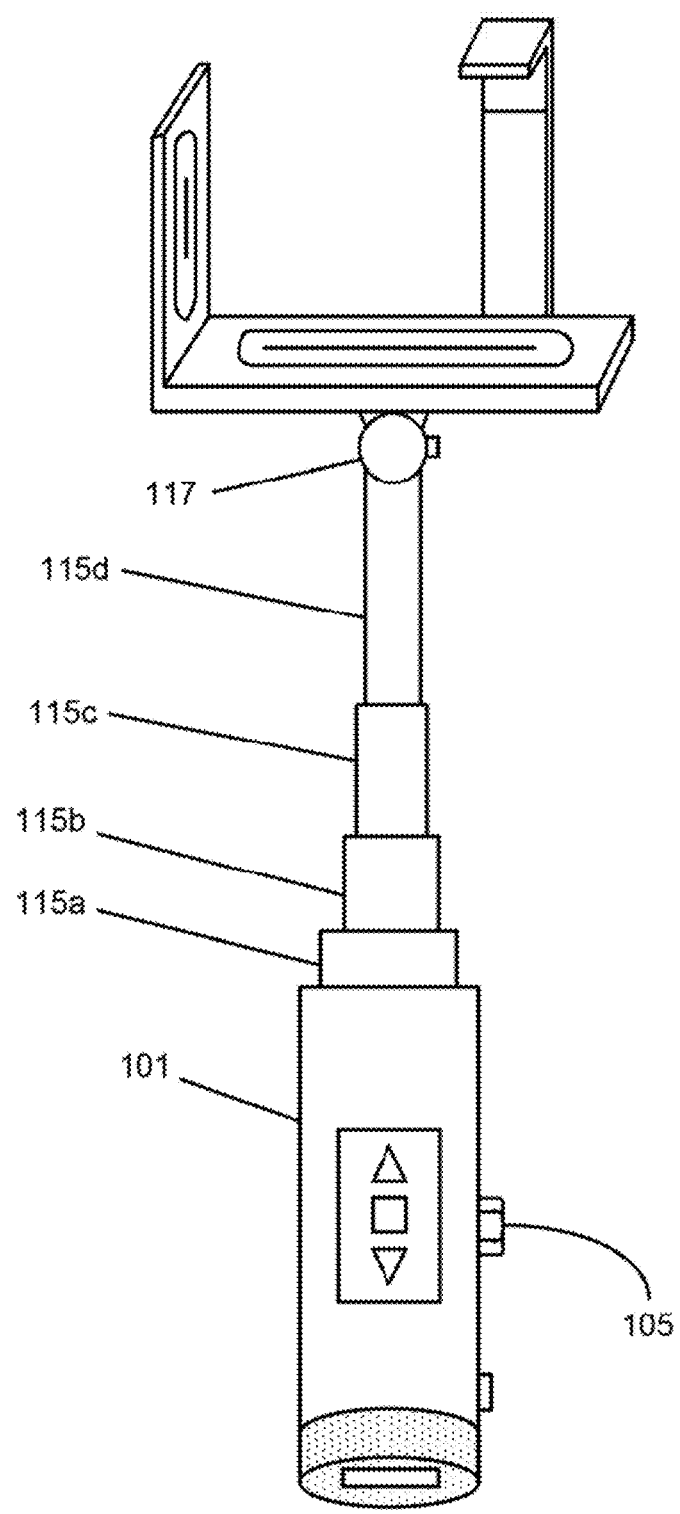
FIG. 2 shows a telescoping monopod apparatus according to one or more embodiments.

FIG. 2 shows a telescoping monopod apparatus according to one or more embodiments. Specifically, FIG. 2 shows a telescoping monopod apparatus when the plurality of shafts (the first shaft (115a), the second shaft (115b), the third shaft (115c), and the fourth shaft (115d)) extends from the body (101). In one or more embodiments, an uppermost shaft (115d) is extended to its fullest extent before the shaft (115c) immediately below the uppermost shafted is extended; the shaft (115c) is extended to its fullest extent before the shaft (115b) immediately below the shaft (115c) is extended, and so forth. In one or more embodiments, the plurality of shafts may simultaneously extend at the same rate as one another. In one or more embodiments, the plurality of shafts may simultaneously extend at a different rate.

In one or more embodiments, the control panel (103) may comprise an up arrow button (157), a square adjust-and-capture button (159), and a down arrow button (161). The control panel (103) and the body (101) may be monolithic. In one or more embodiments, the control panel (103) may comprise an additional housing.

In one or more embodiments, the up arrow button (157) may serve similar function as rotating the adjustment knob (105) in the clockwise direction (111b)(see above). That is, the up arrow button (157) may increase a distance between the rotatable bottom end (109) and an upper end of the fourth shaft (115d).

In one or more embodiments, the down arrow button (161) may serve similar function as rotating the adjustment knob (105) in the counterclockwise direction (111a)(see above). That is, the down arrow button (161) may decrease a distance between the rotatable bottom end (109) and an upper end of the fourth shaft (115d).

In one or more embodiments, the square adjust-and-capture button (159) may serve as a shutter for executing a command to capture an image by the synchronized photographic instrument. In one or more embodiments, the square adjust-and-capture button (159) may serve as an image focuser that works in conjunction with the photographic instrument, determines that a target image of the photographic instrument abides by a certain instruction (See FIG. 6), and then executes a command to capture an image by the synchronized photographic instrument.

In one or more embodiments, the shafts may be extended (increasing a distance between the rotatable bottom end (109) and an upper end of the shaft (115d)) or withdrawn (decreasing a distance between the rotatable bottom end (109) and an upper end of the shaft (115d)) using the adjustment knob (105).

In one or more embodiments, the shafts may be extended (increasing a distance between the rotatable bottom end (109) and an upper end of the shaft (115d)) or withdrawn (decreasing a distance between the rotatable bottom end (109) and an upper end of the shaft (115d)) using the rotatable bottom end (109).

Figure 3:
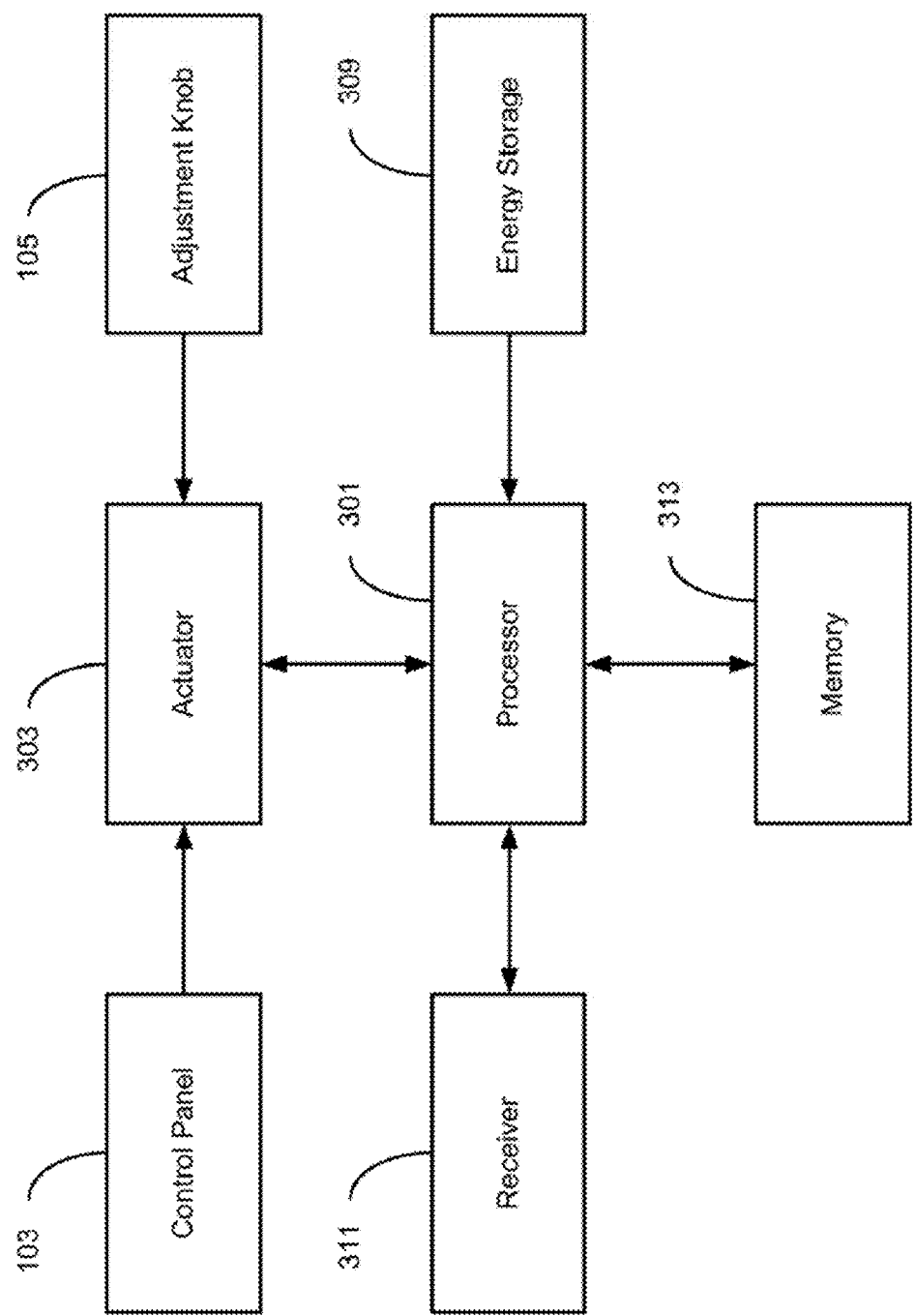
FIG. 3 shows a telescoping monopod apparatus system according to one or more embodiments.

FIG. 3 shows a telescoping monopod system according to one or more embodiments. Explanations of components that have already been described will be omitted for the sake of brevity. As shown in FIG. 3, the telescoping monopod apparatus system has both control component and electrical component. The multiple components may comprise a processor (301), an actuator (303), an energy storage (309), a receiver (311), a memory (313), a control panel (103), and an adjustment knob (105). As also shown in FIG. 3, the multiple components of the telescoping monopod apparatus system may interact, connect, and/or communicate with one another directly or indirectly. Each of these components, along with their functions and interactions with other components, is described below.

In one or more embodiments, the processor (301) may be a microprocessor or any multipurpose, programmable device that accepts a user input (which may be digital data) as input, processes the input according to instructions stored in the memory (313), and provides the results to actuator (303). In one or more embodiments, the processor (301) may be an integrated circuit for processing input. The results may cause the actuator (303) to move certain components of the telescoping monopod apparatus. The results may cause the actuator (303) to move certain components of the telescoping monopod apparatus at a certain speed, rate, direction, etc.

In one or more embodiments, the actuator (303) may be a gear system having a motor and a plurality of gears pinned to the plurality shafts. The gears attached to each of the plurality of shafts may be chained so as to enable motion translation from one shaft to another shaft. The gear arrangement is not limited so long as the shafts can be configured to move (extend or withdraw) in a direction parallel to the center axis of the body (101). The motor may be any common electric motor that is powered by direct current (DC) sources (e.g., batteries, etc.) or by alternating current (AC) sources.

In one or more embodiments, the actuator (303) may be a conveyor belt system. The conveyor belt system is described in more details in reference to FIGS. 4A-4C.

In one or more embodiments, the actuator (303) may be any system that enables motion translation from one shaft to another shaft. The actuator (303) is not limited so long as the shafts can be configured to move (extend or withdraw) in a direction parallel to the center axis of the body (101). In one or more embodiments, the actuator (303) may comprise mirrors and shafts (See FIGS. 5B and 5C). In one or more embodiments, the actuator (303) may comprise the ball (117).

In one or more embodiments, the energy storage (309) may be any storage that can store power to power the motor of the actuator (303). For example, the energy storage (309) may be a battery.

In one or more embodiments, the receiver (311) may be an antenna configured to transmit and receive wireless communication to and from an electronic device. When the receiver (311) receives transmission from the electronic device, the electronic device may be able to provide commands to the telescoping monopod apparatus system. That is, an electronic device separate from the telescoping monopod apparatus may be utilized to, for example, execute a command to capture an image by the photographic instrument that is synchronized with the telescoping apparatus. The electronic device may be, for example, a wireless shutter release remote control.

In one or more embodiments, the receiver (311) may be a plurality of antennas configured to receive and transmit wireless communication to and from an electronic device. When the receiver (311) wirelessly receives transmission from the electronic device, the electronic device may be able to provide commands to the telescoping monopod apparatus system. That is, an electronic device separate from the telescoping monopod apparatus may be utilized to, for example, execute a command to capture an image by the photographic instrument that is synchronized with the telescoping apparatus. The electronic device may be, for example, a wireless shutter release remote control. The electronic device may be, for example, the photographic instrument.

In one or more embodiments, the memory (313) stores instructions regarding certain actuation of the actuator (303). In one or more embodiments, the memory (313) may be, for example, random access memory (RAM), cache memory, flash memory, etc.

In one or more embodiments, the control panel (103) is operatively connected to the actuator (303) and the processor (301). The control panel (103) is described in more details in reference to FIGS. 1A and 2.

Figures 4A, 4B, 4C:
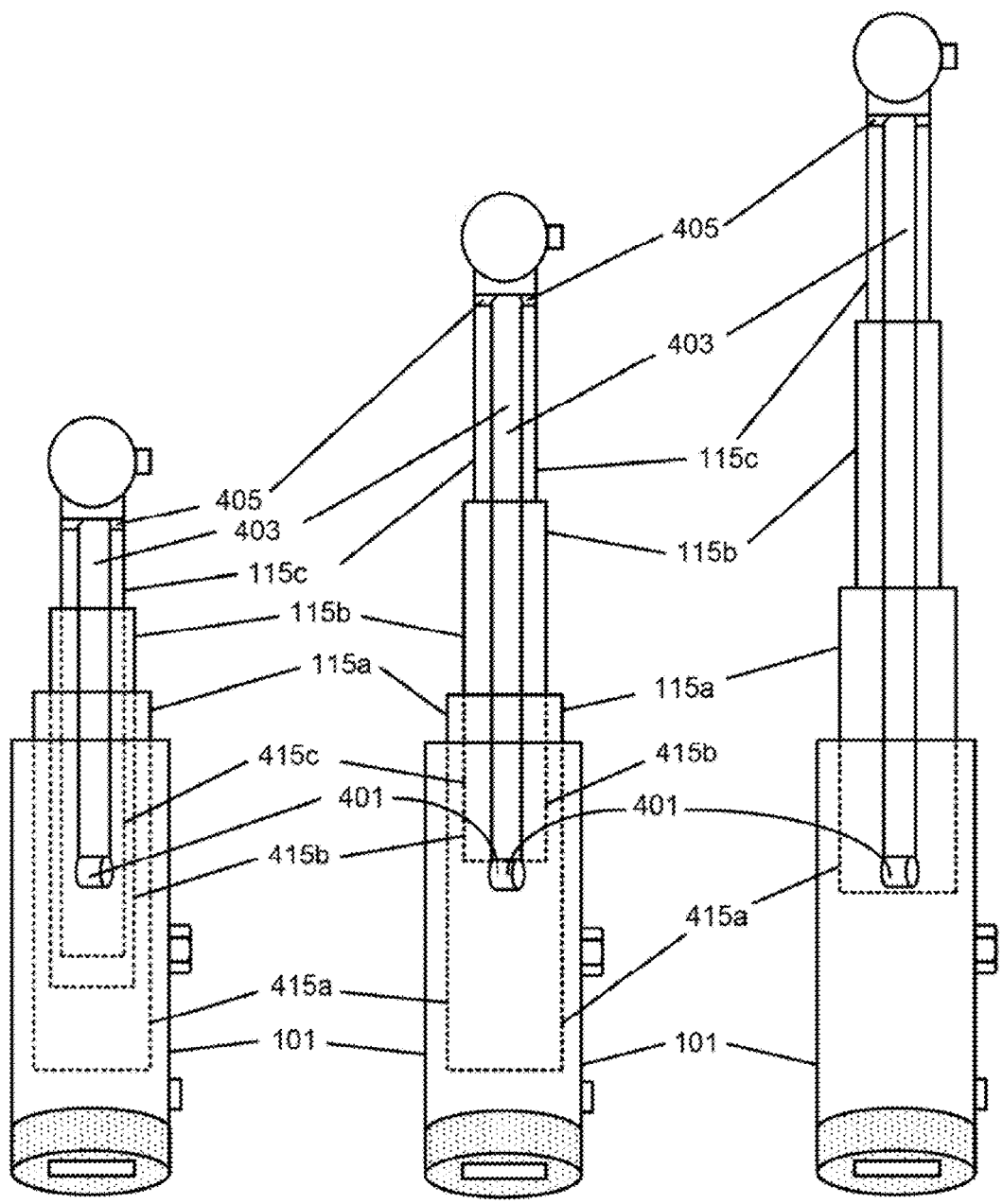
FIG. 4A shows a telescoping monopod apparatus according to one or more embodiments.
FIG. 4B shows a telescoping monopod apparatus according to one or more embodiments.
FIG. 4C shows a telescoping monopod apparatus according to one or more embodiments.

FIGS. 4A-4C show a telescoping monopod apparatus according to one or more embodiments. Explanations of components that have already been described will be omitted for the sake of brevity. FIGS. 4A-4C show a progression of the extension of the plurality of shafts (the first shaft (115a), the second shaft (115b), and the third shaft (115c)) by the actuator (303). However, as discussed, the disclosure is not limited thereto. That is, any moving mechanism may be utilized to actuate the shafts. When an input is given via the control panel (e.g., the up arrow button (157), the square adjust-and-capture button (159) the down arrow button (161), etc.), via the rotatable bottom end (109), or via the adjustment knob (105), the conveyor belt system may drive the conveyor belt (403) in a first direction so as to increase a distance between an upper end of the uppermost shaft (115c) and the rotatable bottom end (109). In one or more embodiments, the conveyor belter system may drive the conveyor belt (403) in a second direction (opposite of the first direction) so as to decrease a distance between the upper end of the uppermost shaft (115c) and the rotatable bottom end (109).

As discussed above, in one or more embodiments, the uppermost shaft (115c) may be extended to its fullest extent before the shaft (115b) immediately below the uppermost shafted is extended; the shaft (115b) is extended to its fullest extent before the shaft (115a) immediately below the shaft (115b) is extended.

FIG. 4A shows a snapshot of when the uppermost shaft (115c) is being extended by the conveyor belt system. In one or more embodiments, the conveyor belt system may comprise a conveyor motor (401), a conveyor belt (403), conveyor belt holder (405). The conveyor motor (401) may be configured to drive the conveyor belt system upon receipt of instruction from the receiver (311) or input from the user. The conveyor belt system may be configured to change a distance between the ball uppermost shaft (115c) and the rotatable bottom end (109). In one or more embodiments, the conveyor belt holder may be attached to an upper end of the uppermost shaft (115c).

FIG. 4A shows a snapshot of when the uppermost shaft (115c) is just beginning to be extended by the conveyor belt system. Thus, the hidden portions (415a-415c) of the respective shafts (115a-115c) constitute a significant length of the respective shafts.

FIG. 4B shows a snapshot of when the uppermost shaft (115c) is fully extended. Thus, the hidden portion (415c) that corresponds the uppermost shaft (115c) constitutes a much smaller length in view of the total length of the uppermost shaft (115c). And because the second shaft (115b) is in the middle of an extension operation, its hidden portion (415b) is shorter in FIG. 4B than it is in FIG. 4A.

FIG. 4C shows a snapshot of when the uppermost shaft (115c) and the second shaft (115b) are fully extended. Thus, their respective hidden portions (415c, 415b) constitute a much smaller length in view of the total length of their respective shaft (115c, 115b). And because the first shaft (115a) is in the middle of an extension operation, its hidden portion (415a) is shorter in FIG. 4C than it is in FIG. 4A or FIG. 4B.

Figure 5A:
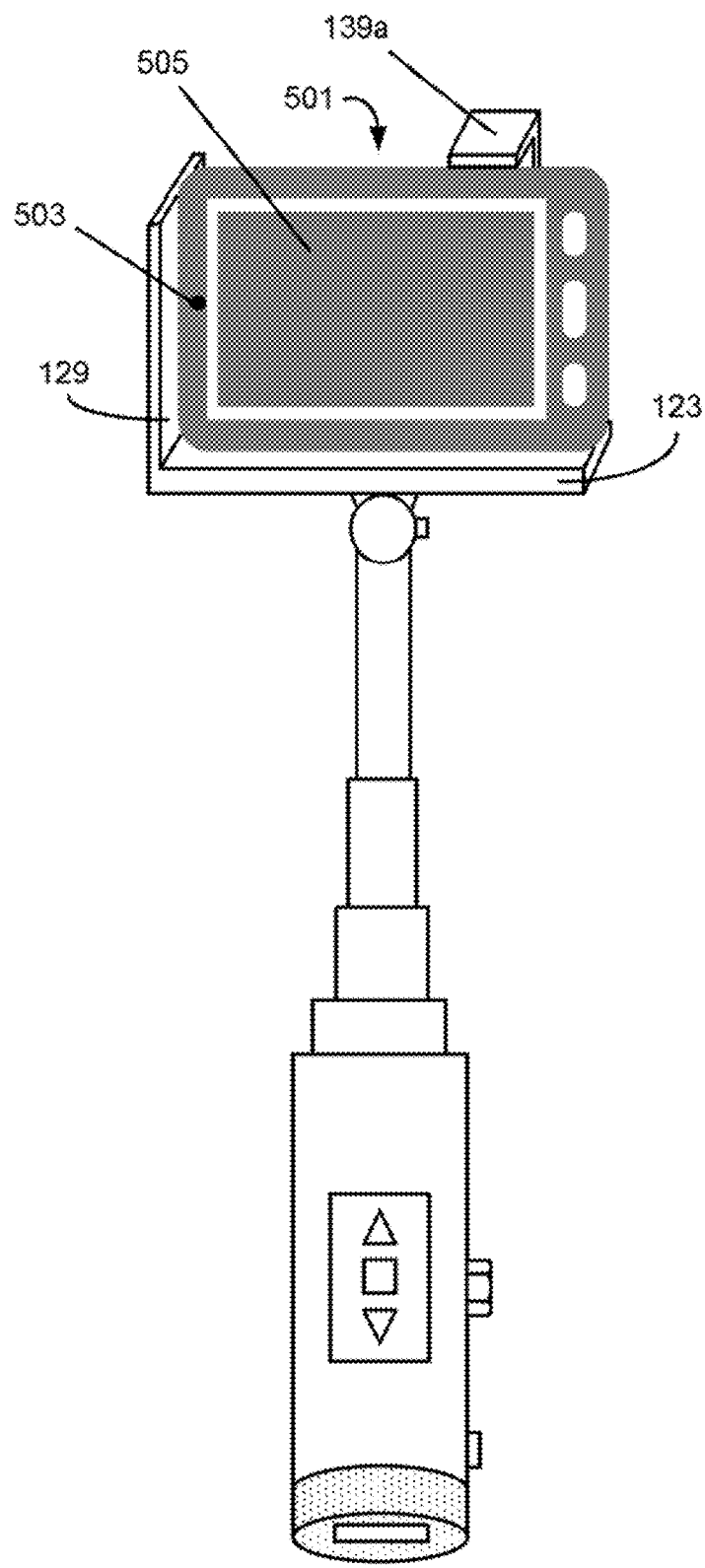
FIG. 5A shows a telescoping monopod apparatus according to one or more embodiments.

FIG. 5A shows a telescoping monopod apparatus having mirrors according to one or more embodiments. Specifically, FIG. 5A shows a photographic instrument (501) being held in the holder of the telescoping monopod apparatus according to one or more embodiments. In one or more embodiments, the photographic instrument (501) may comprise a camera (503) for capturing a target image, a display (505) for displaying a preview of the target image, and a plurality of control buttons (not labelled). While the photographic instrument (501) is shown to be restrained by the side wall (129) and the holding claw (139a), various modifications may be made. Examples of those various modifications have been described. However, the disclosure is not limited thereto. Specifically, one of ordinary skill in the art would appreciate that the disclosure may be modified in any shape or form so as to secure the photographic instrument (501) to the holder of the telescoping monopod apparatus. Further, although the disclosure is, in one aspect, generally directed to a telescoping monopod apparatus for holding a photographic instrument (501), the telescoping monopod apparatus need not hold the photographic instrument (501). That is, the photographic instrument (501) may be used to hold any portable or non-portable device. The telescoping monopod apparatus is not limited to hold an image-acquisition device.

In one or more embodiments, the photographic instrument (501) may be at least one selected from the group consisting of a smartphone, a laptop, a tablet, a phablet, a camera, a personal digital assistant (PDA), and any instrument that is capable of synchronizing with the telescoping monopod apparatus and capturing an image.

In one or more embodiments, the telescoping monopod apparatus may configured to hold an image-acquisition device. The image-acquisition device is not limited to outputting photographs. In one or more embodiments, the telescoping monopod apparatus may be directed to holding an image-acquisition device that outputs caricatures, cartoons, night vision images, heat maps, videos, etc., in any format that is available to those skilled in the art.

Figure 5B:
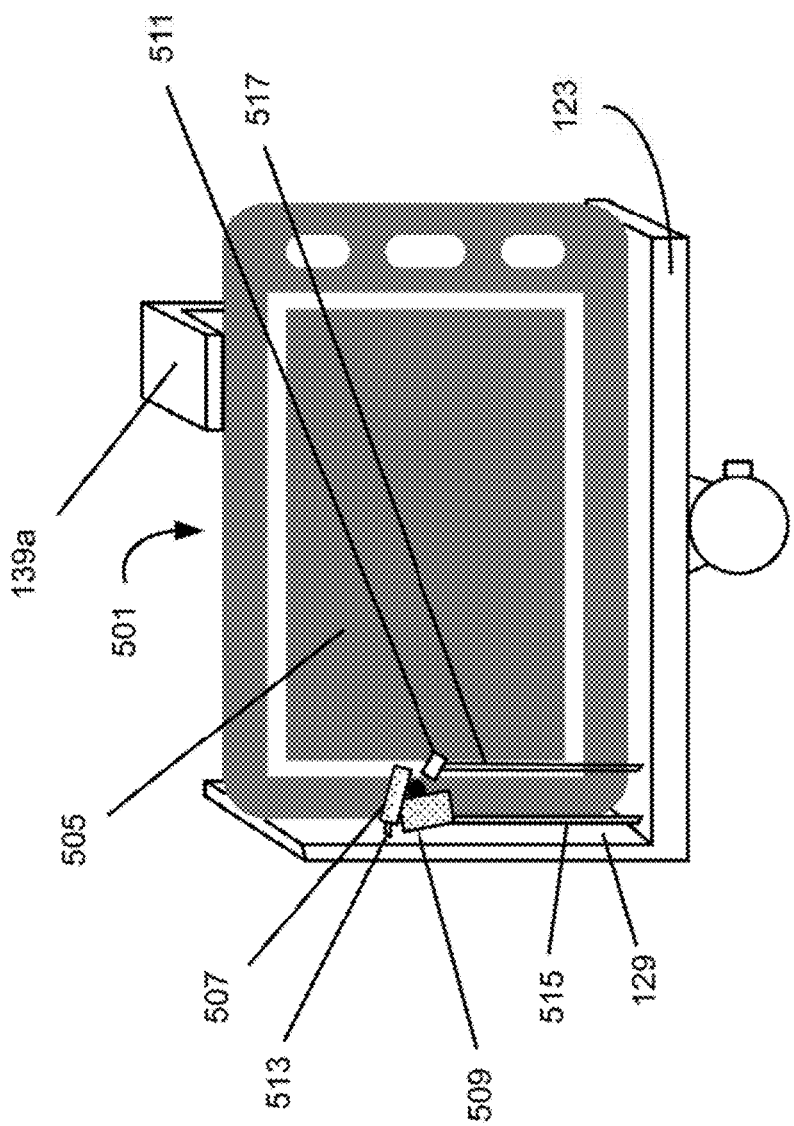
FIG. 5B shows a telescoping monopod apparatus having mirrors according to one or more embodiments.

FIG. 5B shows a telescoping monopod apparatus according to one or more embodiments. One or more embodiments of the disclosure are related to actuating the photographic instrument (501) itself to capture an image of the user using the photographic instrument (501). In one or more embodiments, as shown in FIG. 5B, three mirrors (507, 509, 511) may be used in congruence with the camera (503) of the photographic instrument (501). That is, by actuating the mirrors (507, 509, 511), the photographic instrument (501) may be able to capture a target image without actuating the position of the photographic instrument (501). Advantageously, the actuating of the mirrors (507, 509, 511) so that the photographic instrument (501) is able to adjust its view and capture a target image may be completed more precisely and consume less power and time than actuating the entire photographic instrument (501) by the telescoping monopod. This is due in part because the mirrors (507, 509, 511) are generally lighter in weight than that of the photographic instrument (501).

In one or more embodiments, the mirrors (507, 509, 511) may be deformable mirrors. Because deformable mirrors have many degrees of freedom, it may be that only one mirror is utilized to adjust the photographic instrument's (501) pan and tilt. For example, two shafts may be connected to one mirror—one shaft connected to the mirror at the mirror's circumference and one shaft connected to the mirror at the mirror's center. By pushing the shaft connected to the mirror's center inwardly or outwardly, the mirror may become convex or concave and change the view of the photographic instrument (501) accordingly. One of ordinary skill in the art would understand that the degrees of freedom of the mirror may be determined by the number of shafts/ actuators attached to the mirror. Accordingly, the number of shafts and actuators used can vary from one embodiment to another.

Specific implementations of the deformable mirrors are not limited. In one or more embodiments, the deformable mirrors may comprise a plurality of mirror pieces. Each of which is able to move independently of another. In one or more embodiments, a plurality of actuators/shafts may be utilized to bend the mirror. In one or more embodiments, the deformable mirrors may work in conjunction with magnets.

In one or more embodiments, the deformable mirrors may be coupled to a heat source that exerts heat to the mirrors to cause a bending. In one or more embodiments, the deformable mirrors may be liquid deformable mirrors held in a container and made with suspension of magnetic nanoparticles dispersed in the liquids.

In one or more embodiments, each of the mirrors (507, 509, 511) may be actuated by its own shaft (513, 515, 517). The shafts (513, 515, 517) may be connected to a motor of the actuator (303) located in the body (101). In one or more embodiments, the shaft (513) of the mirror (507) may be disposed on the side wall (129). In one or more embodiments, the shafts (515, 517) of the mirrors (509, 511) may be disposed on the base (123). In one or more embodiments, the mirror (507) may be used to pan the photographic instrument (501). In one or more embodiments, the mirror (507) may be used to tilt the photographic instrument (501). In one or more embodiments, the mirror (509) may be used to pan the photographic instrument (501). In one or more embodiments, the mirror (509) may be used to tilt the photographic instrument (501). In one or more embodiments, the mirror (511) may be used to pan the photographic instrument (501). In one or more embodiments, the mirror (511) may be used to tilt the photographic instrument (501). In one or more embodiments, the mirrors (507, 509, 511) may be used to in congruence with the ball (117) to achieve pan, tilt, and rotation. Further, one of ordinary skill in the art would appreciate that the mirror sizes of the mirrors (507, 509, 511) are not limited, so long as a target image is reflected from one mirror to another and ends up as an input to the camera (503) of the photographic instrument (501).

In one or more embodiments, an input (e.g., video stream) may be received by the photographic instrument (501) when in an image-acquisition mode. Specific details relating to face detection and recognition are described below in reference to FIGS. 6-9. When the photographic instrument (501) determines that the input needs to be actuated, it will wire or wirelessly communicate with the synchronized telescoping monopod apparatus. The telescoping monopod apparatus will thereby actuate the shafts (513, 515, 517) so that the mirrors are moved in accordance to an instruction from the photographic instrument (501).

Figure 5C:
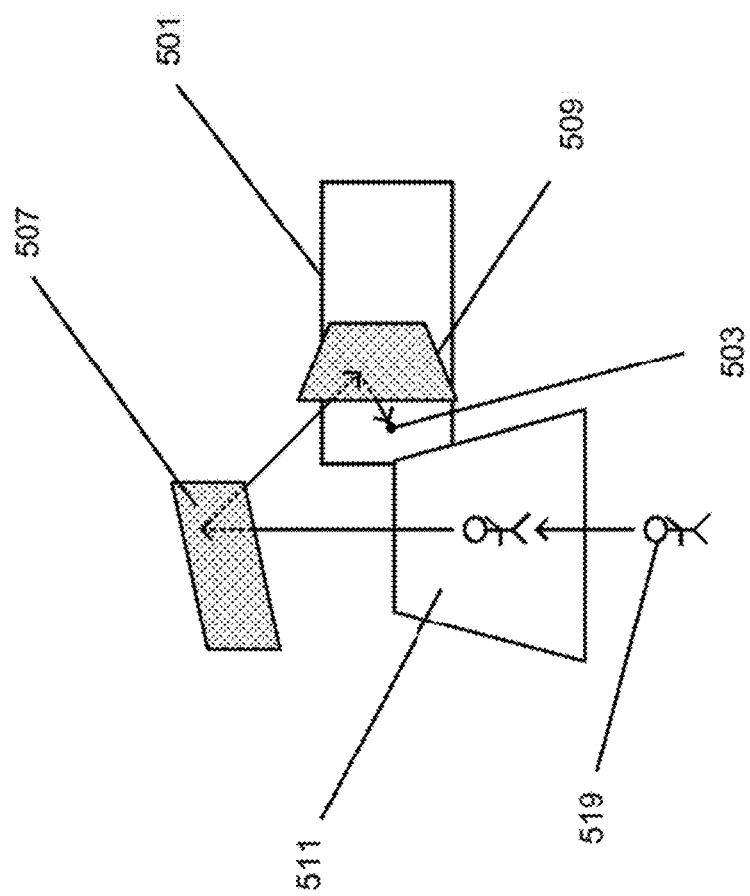
FIG. 5C shows a telescoping monopod apparatus having mirrors according to one or more embodiments.

FIG. 5C shows a telescoping monopod apparatus having mirrors according to one or more embodiments. In FIG. 5C, a user (519) uses the telescoping monopod apparatus having mirrors (507, 509, 511). Each of the mirrors (507, 509, 511) may be actuated by its own shaft or may share a shaft with another mirror. In one or more embodiments, a target image of the user (519) may be received by the mirror (511). The mirror (511) then reflects the target image to the mirror (507). The mirror (507) receives the target image of the user (519) and further reflects the target image to the mirror (509). Finally, the target image is reflected by the mirror (509) to the camera (503) of the photographic instrument (501). The target image is thereby captured as input and displayed on a display of the photographic instrument (501). As discussed above, the shaft of each mirror may be changed in length, height, or width to accompany differences in size, form, and/or shape of different photographic instruments. In one or more embodiments, the size of the mirror (511) may be the largest and the size of the mirror (509) may be the smallest. Certain configurations and adjustment of the mirrors' positions, angles, etc. with respect to another may be necessary to ensure properly reflection of the target image of the user (519) to the camera (503). Further, although the disclosure illustrates three mirrors, one of ordinary skill in the art would appreciate that one mirror at a minimum may carry out the function. Further, one of ordinary skill in the art would appreciate that more than three mirrors may be utilized. One of ordinary skill in the art would further appreciate that each of the mirrors may be positioned such that each mirror displays only that which is considered the target image—nothing more, nothing less. In one or more embodiments, a predetermined threshold may exist for some errors in translating a target image from one mirror to the next (and ultimately into the camera (503)).

In one or more embodiments, the mirrors may be external from the photographic instrument (501). In one or more embodiments, the mirrors may be internal thereof (501). This may advantageously protect mirrors from breakage, dust, etc. In one or more embodiments, where the mirrors are housed as a part of the photographic instrument (501), a portion of the photographic instrument (501) may be transparent so as to enable the mirrors to reflect a wider range of the target image.

Turning to the flowcharts, while the various steps in the flowcharts are presented and described sequentially, one of ordinary skill will appreciate that some or all of the steps may be executed in different orders, may be combined or omitted, and some or all of the steps may be executed in parallel.

FIG. 6 shows a method for using a telescoping monopod apparatus in conjunction with a photographic instrument to capture an image according to one or more embodiments.

In Step 601, the photographic instrument (501) is synchronized with telescoping monopod apparatus. The synchronization may take place wired or wirelessly. In one or more embodiments, the wireless communication may be made possible by, for example, Bluetooth®.

In Step 603, the photographic instrument (501) is properly disposed at a designated area of the telescoping monopod. The designated area may be a holder. Various configurations of the holder has been described and will not be repeated for the sake of brevity.

In Step 605, a processor (301) of the telescoping monopod apparatus may be configured to determine whether the photographic instrument (501) is in an image-capturing mode. In one or more embodiments, if the processor (301) of the telescoping monopod apparatus determines that the photographic instrument (501) is not in an image-capturing mode, a vibrator of the control component may vibrate the body (101) to inform the user of the telescoping monopod that the telescoping monopod apparatus is not in an image-capturing mode. The same vibrator may vibrate the body (101) to inform the user, if the user interacts (i.e., presses) with the control panel (103) and the photographic instrument (501) is not synchronized with the telescoping monopod apparatus. In one or more embodiments, other signaling mechanisms may be used in place of the vibration to inform the user that the synchronizing of Step 601 failed or that the photographic instrument (501) is not in an image-capturing mode. In one or more embodiments, if the processor (301) of the telescoping monopod apparatus determines that the photographic instrument (501) is not in an image-capturing mode, the flowchart may end.

In one or more embodiments, if the processor (301) of the telescoping monopod apparatus determines that the photographic instrument (501) is in an image-capturing mode, the flowchart may proceed to Step 607.

In Step 607, the photographic instrument (501) is configured to capture an image of a target. Before capturing the image, the image-capturing mode displays, on a display of the photographic instrument, a preview image/video stream of the target. In one or more embodiments, the image-capturing mode of the photographic instrument (501), upon detecting that the square adjust-and-capture button (159) has been held depressed for a predetermined amount of time, is configured to determine whether there is a cutoff in the preview image. In one or more embodiments, if the square adjust-and-capture button (159) has been depressed for a predetermined amount of time and it is determined that there is no cutoff in the preview image, the flowchart may proceed to Step 611. In one or more embodiments, if the square adjust-and-capture button (159) has been depressed for a predetermined amount of time and it is determined that there is no cutoff in the preview image, a vibrator of the control component may vibrate the body (101) to inform the user to release the square adjust-and-capture button (159) so as to enable the flowchart to move to Step 611. The vibration of the body (101) to inform the user to release the square adjust-and-capture button (159) so as to proceed to Step 611 may be different in vibration frequency, length, and/or strength than the vibration of the body (101) to inform the user that the synchronizing of Step 601 has failed or that the photographic instrument (501) is not in an image-capturing mode. Differences in vibration advantageously enables the user to differentiate between when the telescoping monopod apparatus and the photographic instrument are in condition for taking a target image and when the telescoping monopod apparatus and the photographic instrument require synchronization, etc.

In one or more embodiments, if the square adjust-and-capture button (159) has been held depressed for a time less than the predetermined amount of time, the flowchart may simply proceed from Step 605 to Step 611 (skipping Step 607 and Step 609).

For example, assuming that the photographic instrument (501) is synchronized with the telescoping monopod apparatus, the photographic instrument is placed in a designated area of the telescoping monopod, the image photographic instrument is in an image-capturing mode, the user simply clicks on the square adjust-and-capture button (159) for less than a second, and the predetermined time is a second, the telescoping apparatus may transmit a command to the photographic instrument, thereby making the image-capturing mode capture an image of the target if no delay is set. If a delay is set, the clicking on the square adjust-and-capture button (159) for less than a predetermined amount of time enables the flowchart to proceed directly to Step 613 (and omit Step 607 and Step 609).

Returning to discussion of detecting a cutoff, the methodology of determining whether the cutoff exists can vary depending on the algorithm. And depending on the detection and the recognition (discussed in more details with regard to FIGS. 7 and 8), the telescoping monopod may be adjusted differently in Step 609. Various computer vision algorithms disclosed herein may be applied to the telescoping monopod apparatus. In one or more embodiments, various computer vision algorithms are computer readable instructions stored on a non-transitory computer readable medium. In one or more embodiments, the image-capturing mode determines whether a user's face has been cutoff in the target image/vide stream and readjusts the telescoping apparatus (e.g., pan, tilt, roll, zoom, etc.) so that the user's face is no longer cutoff in the target image/video stream.

In one or more embodiments, feature extraction may be used to extract humanoid features associated with the target. That is, if cutoff of a user is detected, the algorithm of the image-capturing mode may determine that at least the user is being cutoff. If a cutoff is determined, the flowchart may proceed to Step 609. If a cutoff is not detected, the flowchart may proceed to Step 611.

In Step 609, the actuator (303) may receive instruction from the processor (301) to produce a movement. Configurations of the actuator (303) and the specific interactions between the control component and the electronic component have been discussed and will be omitted for the sake of brevity. Upon adjusting a distance between an end of the uppermost shaft of the plurality of shafts and the rotatable bottom (109) and/or a position of the holder with respect to the body (101), the flowchart reverts to Step 607 for another determination to take place. In one or more embodiments, the adjusting may be adjusting the ball (117). In one or more embodiments, the adjusting may be adjusting the mirrors (507, 509) and their shafts (511, 513).

In one or more embodiments, the back-and-forth between Step 607 and Step 609 may continue until one of the following occurs: (i) the cutoff is no longer present, (ii) a manual override instruction, in the form of, for example, adjustment knob (105) rotation or rotatable bottom end (109) rotation, is received, by the telescoping monopod apparatus, (iii) a maximum distance between the end of the uppermost shaft of the plurality of shafts and the rotatable bottom end (109) is reached, (iv) the square adjust-and-capture button (159) has been depressed for longer than a predetermined time, or (v) the user is no longer depressing the square adjust-and-capture button (159).

In one or more embodiments, the back-and-forth between Step 607 and Step 609 may continue until whichever of (i)-(v) occurs first. In one or more embodiments, the back-and-forth between Step 607 and Step 609 may continue until whichever two of (i)-(v) occur. Other combinations may be possible to end the "loop."

In Step 611, the processor (301) of the telescoping monopod apparatus determines whether a timer (149) has been utilized to set a delay capture mode. As discussed above, and will be omitted for the sake of brevity, the timer (149) may set a predetermined delay to delay the capturing in Step 615 by positioning the toggle (151) in one of the plurality of gaps. If a delay is determined by the processor (301) to be not set, the flowchart may proceed to Step 615. If a delay is determined by the processor (301) to be set, the flowchart may proceed to Step 613.

In Step 613, a delay in time, corresponding to the time set by the timer (149) occurs before the flowchart proceeds to Step 615.

In Step 615, the target image is captured by the photographic instrument (501), and the flowchart ends.

FIG. 7 shows a method for face detection and recognition and for adjusting a telescoping monopod apparatus in Euclidean space according to the face detection and recognition according to one or more embodiments.

In Step 701, the photographic instrument (501) is in an image-capturing mode. In Step 701, the photographic instrument (501) may receive an input. In one or more embodiments, the photographic instrument (501) may receive a streaming video input in real-time.

In Step 703, the photographic instrument (501) may determine whether the input comprises a face. If the input comprises a face, the flowchart may proceed to Step 611. If the input does not comprise a face, the flowchart may proceed to Step 705.

In Step 705, the photographic instrument (501) may determine whether the input comprises a partial face. If the input comprises a partial face, the flowchart may proceed to Step 707. If the input does not comprise a partial face the flowchart may proceed to Step 711.

In Step 707, a position of the partial face relative to the photographic instrument may be determined by the photographic instrument (501).

In Step 709, the photographic instrument (501) may zoom out or may cause the photographic instrument to increase a distance between the user and the photographic instrument (501) based on the determined position. In one or more embodiments, upon detecting, by the photographic instrument (501), a tilted face, the photographic instrument (501) may cause the telescoping monopod apparatus to pan, tilt, or rotate to arrive at a target image. In one or more embodiments, the adjusting may be adjusting the ball (117). In one or more embodiments, the adjusting may be adjusting the mirrors (507, 509, 511) and their shafts (513, 515, 517).

In one or more embodiments, the flowchart may proceed from Step 709 to Step 611. In one or more embodiments, the flowchart may proceed from Step 709 to Step 703.

In Step 711, the photographic instrument (501) may be panned, tilted, and/or rotated in a predetermined pathway until a predetermined condition is met. The predetermined condition may include at least one of but is not limited to, (i) detecting a partial face, (ii) detecting a face, (iii) receiving a manual input, (iv) detecting that a square adjust-and-capture button (159) is no longer depressed, and (v) detecting that the square adjust-and-capture (159) has been depressed for longer than a predetermined time. In one or more embodiments, the adjusting may be adjusting the ball (117). In one or more embodiments, the adjusting may be adjusting the mirrors (507, 509) and their shafts (511, 513).

If (i), the flowchart may proceed to Step 707 or Step 805; if (ii), the flowchart may proceed to Step 611; if (iii), the flowchart may proceed to Step 611 or end; if (iv), the flowchart may end; and if (v), the flowchart may end.

In one or more embodiments, voice activation may be utilized to call attention to the photographic instrument (501). Upon receiving a voice input, the photographic instrument (501) may send signal to the telescoping monopod apparatus to temporarily depart from the predetermined pathway and search for the location of the user having the voice. If the photographic instrument (501) is unable to locate the partial face or the face of the user providing the voice input, the telescoping monopod apparatus may return to subjecting the photographic instrument (501) to finishing the predetermined pathway. Keywords may be stored in the photographic instrument (501) to prevent inadvertent voice activations. That is, the voice activation may be active only when certain words are pronounced and detected by the photographic instrument (501).

In one or more embodiments, voice activation may be utilized to enable the photographic instrument (501) to search for a partial face or a face. In one or more embodiments, voice activation may be utilized to enable the photographic instrument (501) to search for a partial face or a face without requiring the user to physically interact with the control panel and/or any other component on the telescoping monopod. In one or more embodiments, voice activation may be utilized to enable the photographic instrument (501) to capture an image. In one or more embodiments, voice activation may be utilized to enable the photographic instrument (501) to capture an image when certain words are pronounced and detected by the photographic instrument (501).

FIG. 8 shows a method for face detection and recognition and for adjusting a telescoping monopod apparatus in Euclidean space according to the face detection and recognition according to one or more embodiments. FIG. 8 shows a substantially similar method as that shown in FIG. 7.

Different from FIG. 7, the photographic instrument (501) of FIG. 8 first determines whether there is a partial face in Step 803 and, if not, determine whether there is a full face in Step 809.

Step 801 may be the same as Step 701.

As discussed, in Step 803, the photographic instrument (501) determines whether the input comprises a partial face. If the photographic instrument (501) determines that the input comprises a partial face, the flowchart may proceed to Step 805. If the photographic instrument (501) determines that the input does not comprise a partial face, the flowchart may proceed to Step 809.

Step 805 may be the same as Step 707.

Step 807 may be the same as Step 709.

In Step 809, the photographic instrument (501) determines whether the input comprises a face. If the photographic instrument (501) determines that the input comprises a face, the flowchart may proceed to Step 611. If the photographic instrument determines that the flowchart does not comprise a face, the flowchart may proceed to Step 811.

In Step 811, the photographic instrument may be panned, tilted, and/or rotated in a predetermined pathway until a predetermined condition is met. The predetermined condition may include at least one of, but is not limited to, (i) detecting a partial face, (ii) detecting a face, (iii) receiving a manual input, (iv) detecting that a square adjust-and-capture button (159) is no longer depressed, and (v) detecting that the square adjust-and-capture (159) has been depressed for longer than a predetermined time. In one or more embodiments, the adjusting may be adjusting the ball (117). In one or more embodiments, the adjusting may be adjusting the mirrors (507, 509) and their shafts (511, 513).

If (i), the flowchart may proceed to Step 805; if (ii), the flowchart may proceed to Step 611; if (iii), the flowchart may proceed to Step 611 or end; if (iv), the flowchart may end; and if (v), the flowchart may end.

Figure 9:
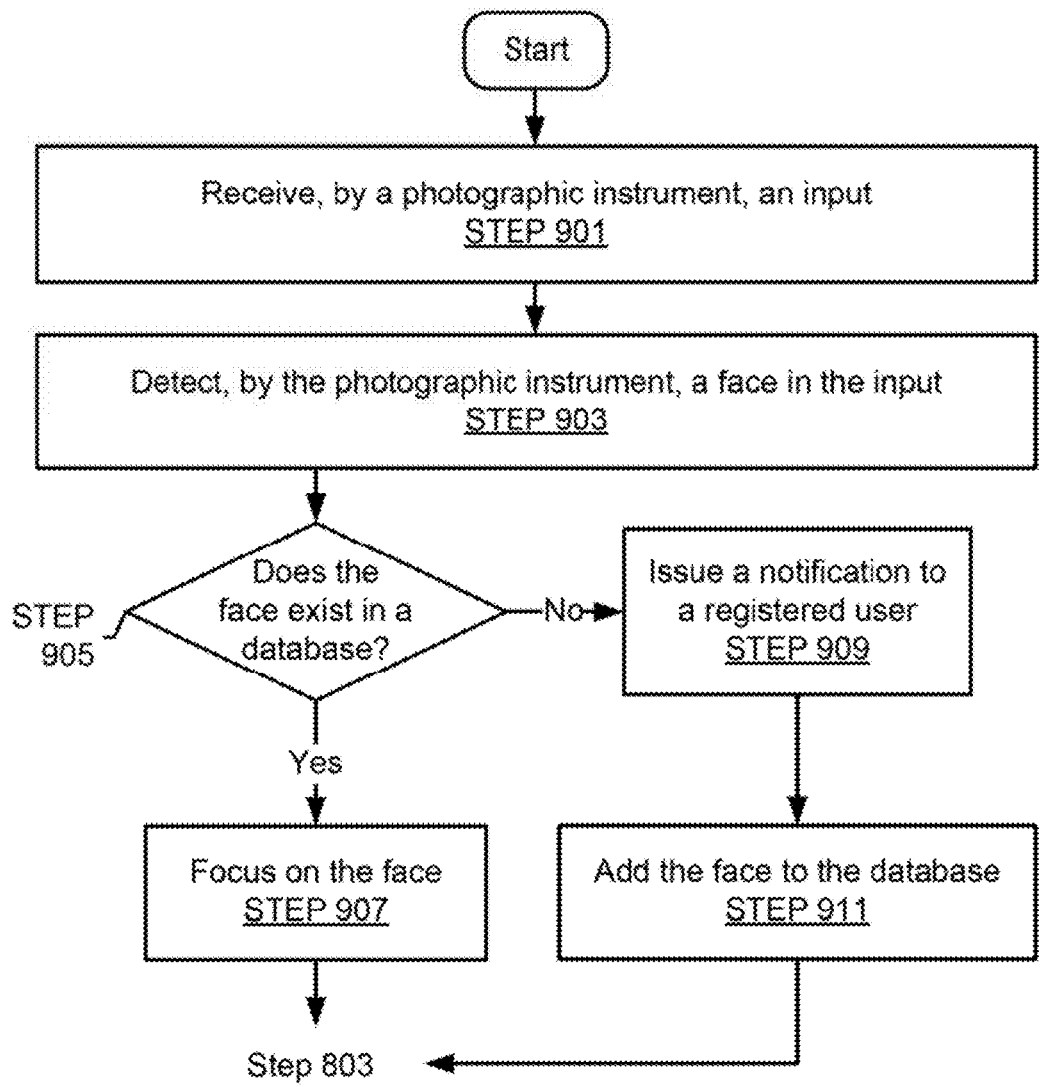
FIG. 9 shows a method for focusing a photographic instrument according to one or more embodiments.

FIG. 9 shows a method for focusing a photographic instrument according to one or more embodiments. FIG. 9 also shows an antitheft method for a telescoping monopod according to one or more embodiments.

Step 901 may be the same as Step 701.

In Step 903, the photographic instrument (501) detects a face in the input.

In Step 905, the photographic instrument (501) and/or a telescoping monopod apparatus synchronized with the photographic instrument (501) may determine whether the face exists in a database. The database may be stored in a server separate from the photographic instrument (501) and/or the telescoping monopod apparatus. The database may be stored in the memory (313) of the telescoping monopod apparatus. The database may be stored in a memory of the photographic instrument (501). If the face does not exist in the database, the flowchart may proceed to Step 909. If the face does exist in the database, the flowchart may proceed to Step 907.

In Step 907, the photographic instrument (501) may focus on the face.

In Step 909, a notification (e.g., email, text, etc.) may be sent to a registered user. The registered user may be a user who has registered the telescoping monopod apparatus when he purchased the telescoping monopod apparatus. The notification may comprise the face, a GPS location of the telescoping monopod and/or the photographic instrument (501), etc. The notification may or may not be disabled using the telescoping monopod apparatus. In one or more embodiments, the notification may request input from the registered user. The input may be "yes" or "no" to the question "Do you know this user?"

In one or more embodiments, if the registered user inputs "yes," the face may be added to the database. In one or more embodiments, if the registered user inputs "no," the telescoping monopod apparatus may be deactivated. That is, the telescoping monopod apparatus may enter a hibernation mode that can only be reactivated by the registered user and/or an authorized retailer of the telescoping monopod apparatus and/or the photographic instrument (501).

In Step 911, the face is added to the database.

In one or more embodiments, the database may be used to provide feedback to the photographic instrument (501) and/or the telescoping monopod apparatus. For example, if, in an image, there exists a plurality of people, the photographic instrument (501), using the database, may focus on the individual who has an entry in the database.

In one or more embodiments, the database may be provided to label individuals in an image when the image is taken by and stored in the photographic instrument (501).

In one or more embodiments, the labeled image may be automatically uploaded to a pre-synchronized social-networking platform. In one or more embodiments, the uploaded images having faces registered as entries in the database may be pre-labeled. The uploaded images may further cause a tagging of, messaging to, and/or notifying the user, having the registered face in the database, on the social-networking platform.

Figure 10:
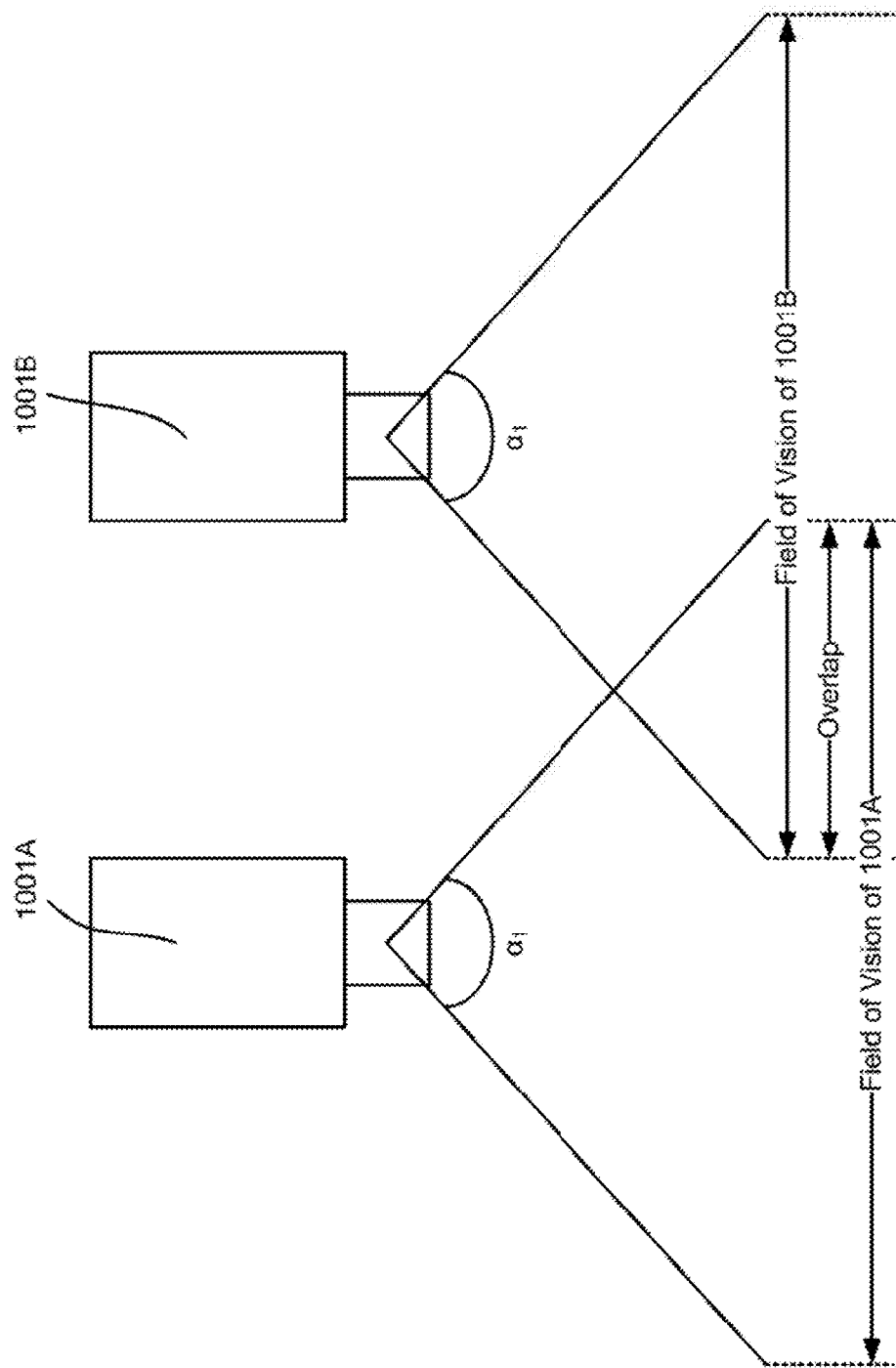
FIG. 10 shows a conventional closed-circuit television (CCTV) system.

FIG. 10 shows a conventional closed-circuit television (CCTV) system.

Each of the CCTV (1001A, 100B) has a field of vision (FOV) spanning $\alpha_1$ degrees. In order for the CCTV to cover additional grounds, the CCTV would either need to be actuated or a second CCTV would have to be employed. In the case where a second CCTV is used, a handoff may be required.

Figure 11:
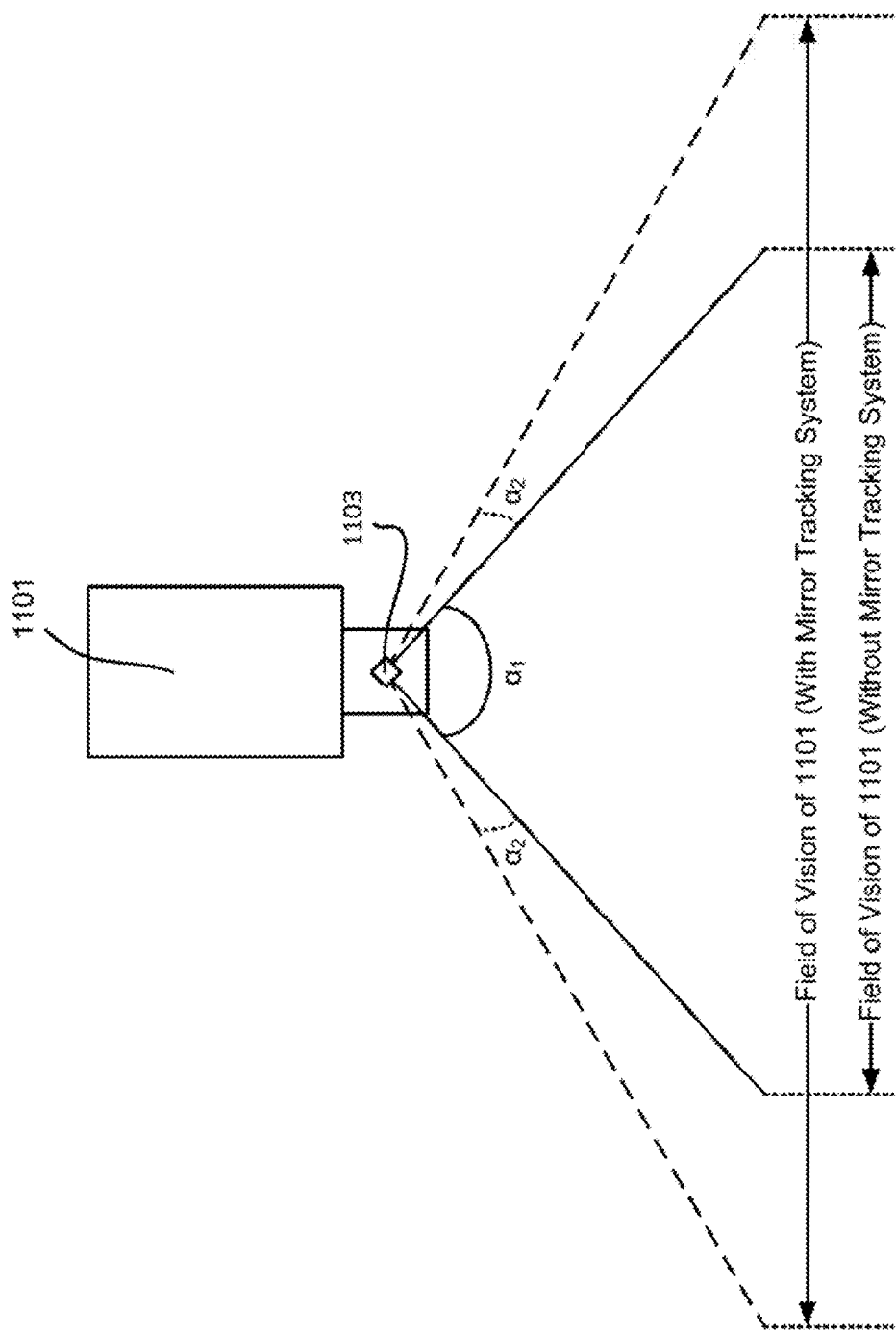
FIG. 11 shows an image processing system for object tracking according to one or more embodiments of the present invention.

FIG. 11 shows an image processing system for object tracking according to one or more embodiments of the present invention. The image processing system may comprise a CCTV (1101), a mirror tracking system, a processor (not shown), and a memory (not shown). The mirror tracking system comprises at least a mirror (1103), a support supporting the mirror (1103), an electronic component for controlling the mirror (not shown), and a control component for controlling the mirror (not shown).

In one or more embodiments of the present invention, the control component may be a conveyor belt, an actuator, a gear system, etc. In one or more embodiments of the present invention, the electronic component may be a power system configured to actuate the actuator, the gear system, etc. The control component and the electronic component may work in conjunction with one another. The control component and the electronic component may be stored in a housing.

Without the mirror tracking system, the image processing system may have a field of vision comparable to that shown in reference to FIG. 1. However, with the mirror tracking system, the CCTV (1101) has a wider field of vision. Specifically, the image processing system is able to cover at least $\alpha_1+2*\alpha_2$ degrees without requiring a second CCTV or rotating the CCTV (1101). Although each frame of the CCTV still only has an $\alpha_1$ degree field of vision, a feature moving within the at least $\alpha_1+2*\alpha_2$ degrees FOV can nevertheless be tracked.

In one or more embodiments of the invention, each frame may be stitched together to create a video stream. In one or more embodiments, using object injection, as well as other image processing techniques, the CCTV (1101) may be able to produce a video stream spanning at least $\alpha_1+2*\alpha_2$ degree FOV even though each frame FOV is only $\alpha_1$ degrees. The frame may be stored as an image; the frames, as discussed, may be stored as a video stream. The format of the image and/or the video stream is not limited. One of ordinary skill in the art would appreciate that image compression techniques may be utilized in combination with the image processing system to minimize the amount of memory required to produce the image and/or the video stream.

In one or more embodiments of the invention, the mirror (1103) may be placed in close proximity to a lens of the CCTV (1101). Specifically, a distance between a center of the mirror (1103) and a center of the lens of the CCTV (1101) may be greater than or equal to 1 centimeter. Further, one of ordinary skill in the art would appreciate that the distance could also be less than 1 centimeter. Further, in one or more embodiments of the present invention, the distance between a center of the mirror (1103) and a center of the lens of the CCTV (1101) may be proportional to a diameter of the lens. Further, in one or more embodiments of the present invention, the distance between a center of the mirror (1103) and a center of the lens of the CCTV (1101) may be proportional to a length of the mirror (1103).

In one or more embodiments of the present invention, the mirror (1103) may be of any type. For example, the mirror (1103) may be an aluminum glass mirror, a low aluminum glass mirror, a first surface mirror, a safety glass mirror, a silkscreen printed glass mirror, a silver glass mirror, etc. In one or more embodiments of the present invention, the mirror may be further coated with a high-reflector coating to increase a light reflection rate. In one or more embodiments, the high-reflector coating may enable the mirror to reflect greater than or equal to 99.9% of the light that lands on the mirror.

Figure 12A:
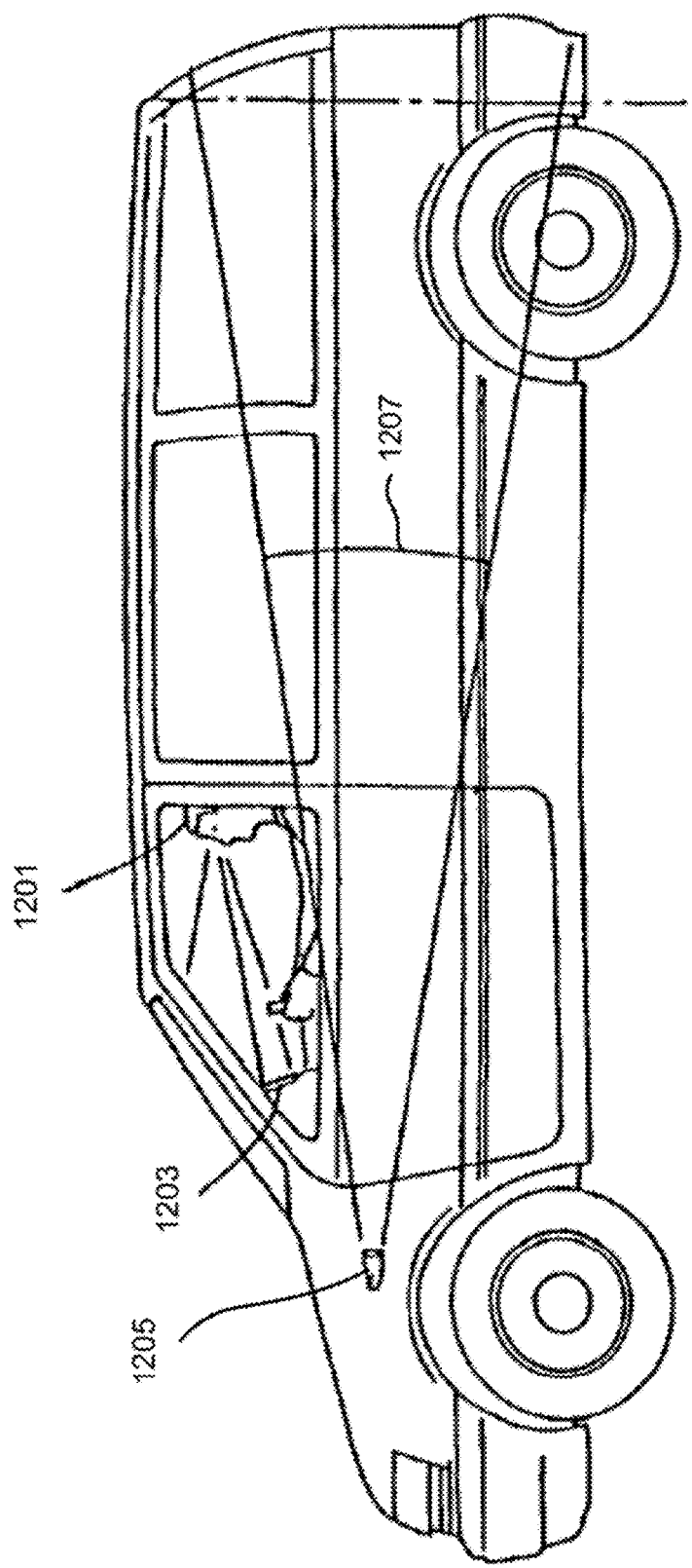
FIG. 12A shows an image processing system for object tracking according to one or more embodiments of the present invention.

FIG. 12A shows an image processing system for object tracking according to one or more embodiments of the present invention. Specifically, FIG. 3A shows that the image processing system is mounted on a vehicle. In a non-limiting attempt to set forth a definition, the term "vehicle" may refer to a bicycle, a passenger vehicle, a bus, a train, an airplane, etc.

FIG. 12A shows a user (1201) of the image processing system driving a vehicle. The image processing system comprises a left side mirror (1203) and an imaging acquisition module (1205) having a vertical field of vision (1207). One of ordinary skill in the art would appreciate that the image acquisition module (1205) may be disposed anywhere. For example, the image acquisition module (1205) may be disposed such that it contacts the left side mirror (1203).

Figure 12B:
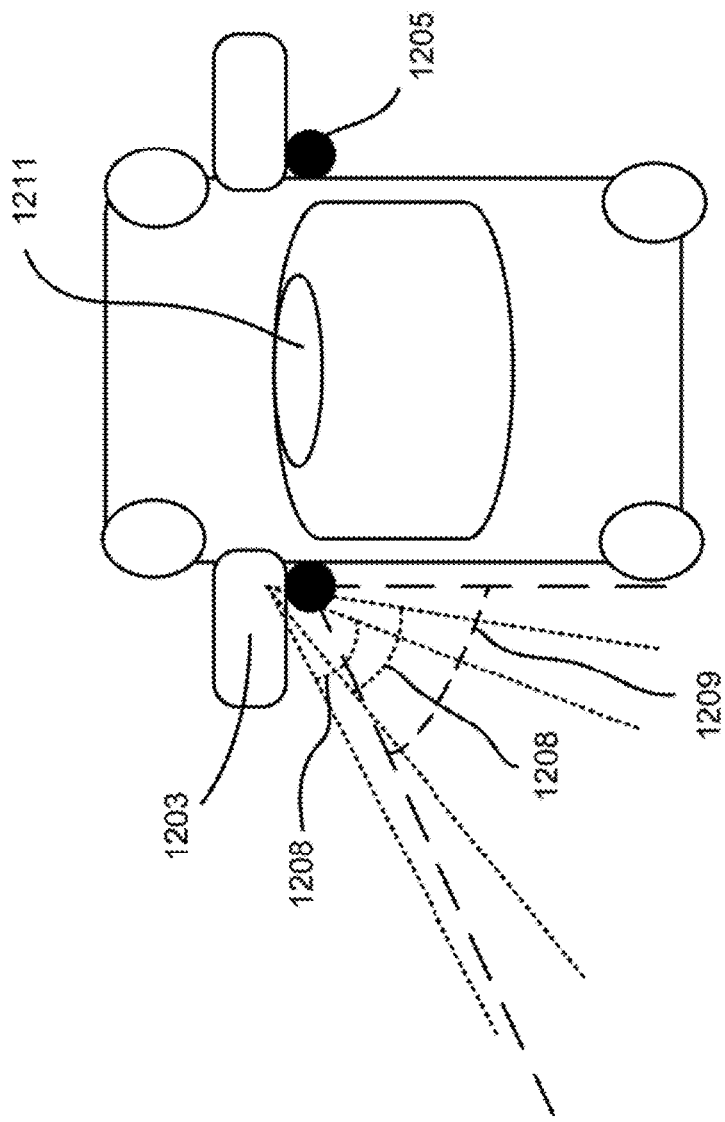
FIG. 12B shows an image processing system for object tracking according to one or more embodiments of the present invention.

FIG. 12B shows an image processing system for object tracking according to one or more embodiments of the present invention. Specifically, FIG. 12B shows that the image processing system is mounted on a vehicle.

In one or more embodiments of the present invention, the image processing system comprises a left side mirror (1203), a right side mirror (not labeled), a rear mirror (1211), a first imaging acquisition module (1205) having a horizontal field of vision (1209), and a second imaging acquisition module (not labeled). In one or more embodiments of the present invention, the left side mirror (1203) may comprise the horizontal field of vision (1209); otherwise, in one or more embodiments of the present invention, the left side mirror may comprise a horizontal field of vision (1208). The horizontal field of vision (1208) may be the same in magnitude as that of the horizontal field of vision (1209); the two field of visions, however, are different FOVs (i.e., same range but different perspective). The same may be said of the vertical field of vision. In one or more embodiments, the image acquisition module (1209) is configured to actuate the left side mirror (1203) such that the field of vision of the left side mirror is adjusted to display a feature of interest.

In one or more embodiments, multiple image acquisition modules may be used to gather a surround view of the vehicle. By taking multiple images of a particular portion of the vehicle, the image processing system may stitch together a single surround view of the vehicle. And, in one or more embodiments, the images may be further stitched to create a video stream.

Explanations for the right side mirror and the second imaging acquisition module are omitted for the sake of brevity as they are similar to, but function in opposite direction, as the left side mirror (1203) and the first imaging acquisition module (1205), respectively.

Figure 12C:
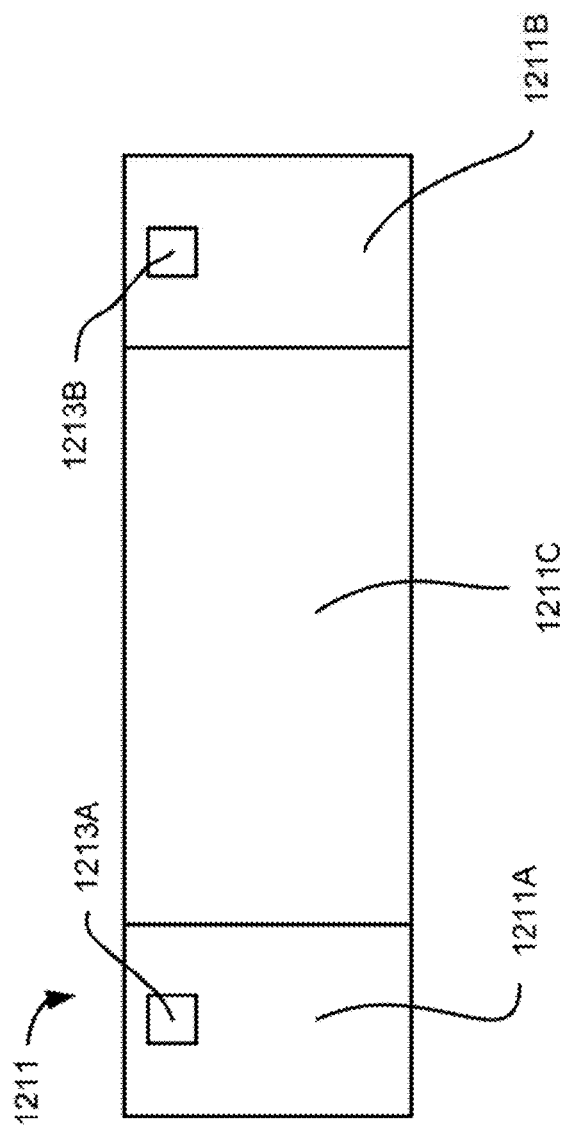
FIG. 12C shows an image processing system for object tracking according to one or more embodiments of the present invention.

FIG. 12C shows an image processing system for object tracking according to one or more embodiments of the present invention. Specifically, FIG. 12C shows a rear mirror (1211) of the image processing system; the rear mirror (1211) has a left side display (1211A), a right side display (1211B), and a mirror (1211C). The left side display (1211A) may comprise a left side signal panel (1213A); the right side display (1211B) may comprise a right side signal panel (1213B).

In one or more embodiments of the present invention, the left side display (1211A) is configured to display the feature being tracked by the left side mirror (1203A). The left side display (1211A) may display when the user turns on the left turn signal; or may be displayed when a user turns on its associated power button. The left side signal panel (1213A) may blink or lit up when a feature is detected to be on the left side of the user.

In one or more embodiments of the present invention, the right side display (1211B) is configured to display the feature being tracked by the right side mirror (1203B). The right side display (1211B) may display when the user turns on the right turn signal; or may be displayed when a user turns on its associated power button. The right side signal panel (1213B) may blink or lit up when a feature is detected to be on the right side of the user.

In one or more embodiments of the present invention, the mirror (1211C) enables the user to see a rear view through a rear window of the vehicle (not shown).

In one or more embodiments of the present invention, the activation (i.e., blink, light up, etc.) of the left side signal panel (1213A) and the right side signal panel (1213B) may be accompanied by a sound (i.e., beep noise). The sound may be disabled; the sound may accompany the activation only when the user signals to turn left or to turn right, etc.

Turning again to the flowchart, while the various steps in the flowchart is presented and described sequentially, one of ordinary skill will appreciate that some or all of the steps may be executed in different orders, may be combined or omitted, and some or all of the steps may be executed in parallel.

Figure 13:
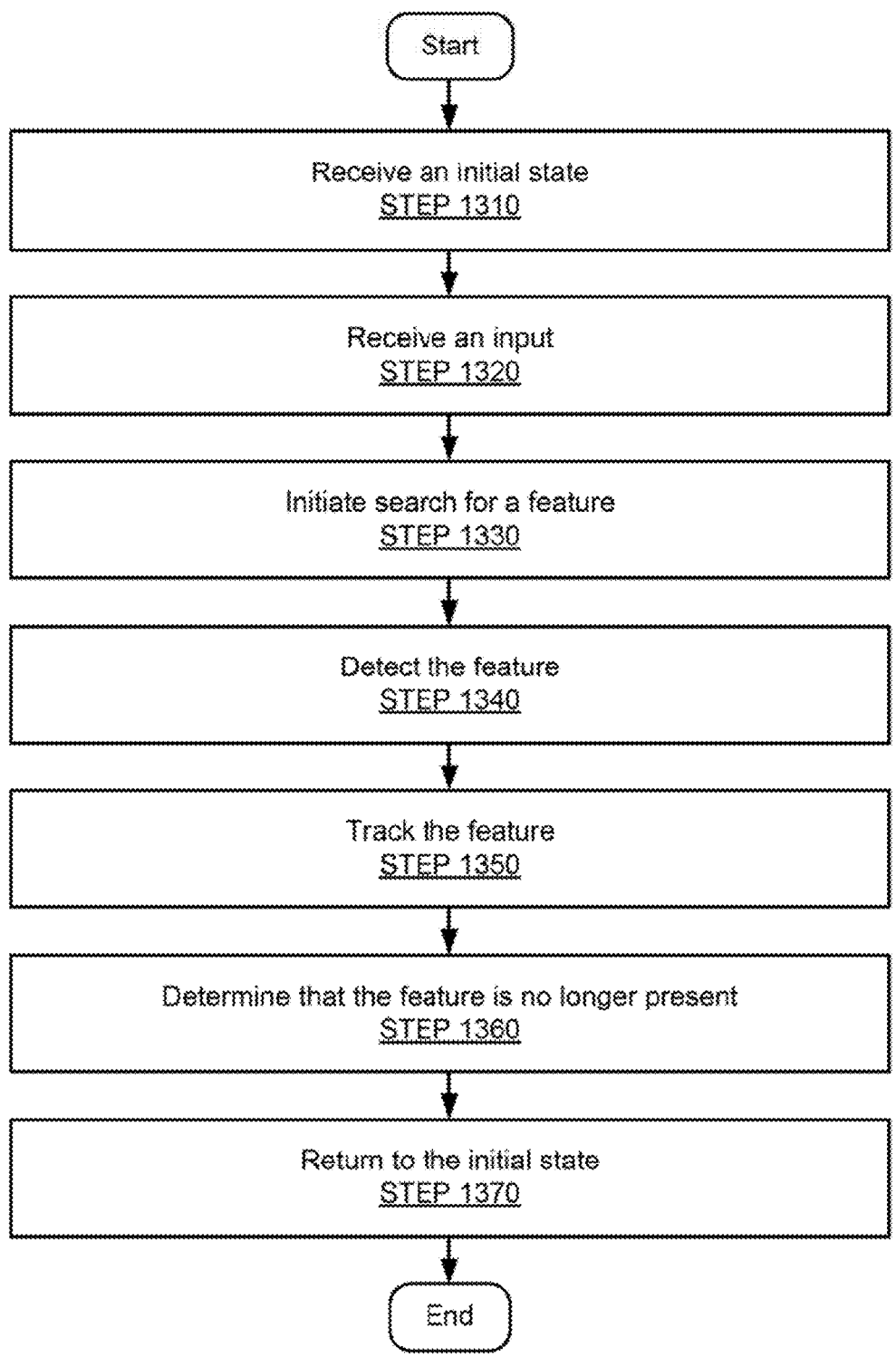
FIG. 13 shows an image processing method for object tracking according to one or more embodiments of the present invention.

FIG. 13 shows an image processing method for object tracking according to one or more embodiments of the present invention.

In Step 1310, an initial state is set by a user and the initial state is stored in a memory of an image processing system. The initiate state may be, for example, a default position of a side mirror, a default position of a CCTV, a default position of an imaging module, etc.

In Step 1320, the image processing system receives an input. In one or more embodiments of the present invention, the input may be a manual input from the user (i.e., the user is turning on a left turn blinker, the user is turning on a right turn blinker, the user has shifted to reverse gear, etc.). In one or more embodiments of the present invention, the input may be an automatic input. For example, the image processing system detects that an object has entered its FOV. For example, a particular threshold has been met (i.e., temperature threshold, etc.).

In Step 1330, the image processing system initiates search for a feature. In one or more embodiments, the image processing system searches, within its FOV, whether a feature of interest is present. In the case that the search was initiated due to an automatic input (i.e., an object has entered the image processing system's FOV), the FOV may simply assess the object and determine whether it is a stored feature. In one or more embodiments, the image processing system comprises a database that stores a list of features.

In Step 1340, the image processing system determines that, within its FOV, there exists an object that matches a feature stored in the database. The matching may be carried out using feature extraction as well as other image processing techniques discussed in U.S. patent application Ser. No. 14/714,349.

In Step 1350, the image processing system tracks the detected feature using a mirror tracking system.

In Step 1360, the image processing system determines that the detected feature is no longer present within its FOV. In one or more embodiments of the present invention, the image processing system may initiate a handoff to enable another CCTV, another image acquisition module, etc., to continue tracking the previously tracked feature. In one or more embodiments of the present invention, the image processing system may actuate the CCTV, etc.

In Step 1370, the image processing system returns the mirror tracking system to its initial position. That is, if it has been determined that the tracked feature is no longer within the FOV of the first CCTV, the first CCTV (if actuated) and its associated mirrors are returned to their initial state while the second CCTV as well as the other CCTVs of the image processing system may continue to track the previously tracked feature.

The above described method may be used in conjunction with the vehicle discussed in reference to FIGS. 12A and 12B. In one or more embodiments of the present invention, the side mirrors may track an object closest to the driver (1201); and when the image acquisition module (1205) determines that there exists another object (determined to be a feature) that is closer to the driver (1201), the image processing system may cause the left side mirror to track the new object instead (if the new object is located to the left of the user). One of ordinary skill in the art would recognize that the driver (1201) may also alter the setting such that the image processing system may track a fastest object, an object specified by the driver (1201), etc.

In one or more embodiments of the invention, the mirror tracking system may continue to actuate so as to track the feature. In one or more embodiments, the mirror tracking system may only actuate when it has been given an input.

Face Detection and Recognition

Various face detection and face recognition algorithms may be implemented in congruence with the photographic instrument (501) and/or the telescoping monopod apparatus.

In one or more embodiments, Cascaded Classifiers may be used to detect a face in an input. As discussed, the input may be a streaming video input from the photographic instrument (501).

In one or more embodiments, at least one of "Tom-vs-Pete" classifiers, high-dimensional local binary patterns, Fisher kernel, Bayesian face recognition, Associate-Predict model, Joint Bayesian algorithm, Face++, GaussianFace, and a combination thereof, may be used to recognize the face in the input.

In one or more embodiments, the user may predetermine where, on the image, the user's head is to be. And in the future, when the user uses the telescoping monopod apparatus along with the photographic instrument, the telescoping monopod apparatus will always position the photographic instrument such that the user is at the predetermined location of the image.

In one or more embodiments, once the photographic instrument locates a face of the user, the photographic instrument will continue to follow the face of the user until, for example, the user captures an image.

While the disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the disclosure has been described with respect to a limited number of embodiments, those skilled in the art, having benefit of this disclosure, will appreciate that other embodiments can be devised which do not depart from the scope of the disclosure as disclosed herein.

For example, the image processing system for object tracking may be deployed at the head of a missile. Specifically, the tracking system may be deployed at the head of semi-automatic or manual missiles. Once the missile is in midair, the pilot who launched the missile or another individual located separately from the pilot may have the same FOV as the missile FOV (which may be displayed using a display device). Further, because some targets are able to quickly decrease its temperature to compromise heat seeking offensives, the pilot or the another individual may be able to view the target and give chase to the target with the assistance of the mirror tracking system.

For example, the image processing system for object tracking may be deployed along with any tracking device to track fast moving objects. For example, the image processing system may be used in combination with cameras at sporting events. For example, the image processing system may be used in combination with rifles, guns, toy guns, etc.

For example, the feature to be tracked can vary depending on the use of the image processing system. In a sports arena, a ball may be the feature of interest. In air combat, a missile may be the feature of interest. In transportation, a line designating a parking space or a curb may be the feature of interest. In photography, a humanoid feature (i.e., eyes, face, mouth, etc.) may be the feature of interest.

For example, in tracking a feature, the image processing system may calculate and display a relationship between the feature and the image processing system. Specifically, the image processing system may calculate and display a distance of the feature from the image processing system, a travel speed of the feature, a relative position of the feature with respect to the image processing system, a relative travel speed of the feature with respect to the image processing system, etc.

For example, the left side display (1211A) and the right side display (1211B) of the rear mirror (1211) may each be a touch panel that enables an individual to indicate a feature of interest. Upon identification of the feature of interest by the user in the left side display (1211A), the left side mirror may be configured to track the feature of interest.

For example, rather than searching through an entire image for a feature, the image processing system may employ an object proposal technique to identify potential interesting areas.

Once object proposal has identified interesting segments/features in an image, an object classification technique may be used to identify those interesting segments/features. Subsequently, a ranking method may be employed to rank and order the importance of these interesting segments/features with respect to one another. For example, in the case of tracking a feature of interest in the sky, the object classification technique may detect and identify a plurality of items and then, using the ranking method, rank airplane and missile as top priority, whereas birds, clouds, etc., may be disregarded. In one or more embodiments, a distance of a feature, a speed of a feature, a color of a feature may be accounted for when determining the priority. In one or more embodiments, the rank may be predetermined, the rank may be determined by the user (using voice command, a score input from 1-10, physical interaction with a display device, etc.). In one or more embodiments, the rank may be binary (critical v. non-critical) or on a scale of 1 through 10, etc. In one or more embodiments, the rank may be self-learned based on the tracking behavior of the user. That is, when two interesting features are identified, the system may prompt for user input to determine which of the two features to track. Next time, the system may, by default, track the more frequently selected item when two features again appear together (thereby setting a new ranking). Of course, one of ordinary skill in the art would appreciate that this can be expanded to when multiple interesting features simultaneously appear.

In one or more embodiments, object proposal may mark interesting features using bounding boxes, contour lines, as well as other identifying labels. One of ordinary skill in the art would appreciate that numerous object proposal techniques are possible and that the optimal technique can vary from one application to another.

For example, the image processing system may be able to learn features automatically or based on user input (i.e., the user interacts with a bird shown in the left side display (1211A) or the image processing system determines such an object to be interesting and prompts the user to add the feature as a new category for next identification).

For example, images and the video streams may be continuously generated and stored. For example, the images and the video streams may be wirelessly transmitted to a database, etc. The images and the video streams may subsequently be used for investigation into an accident, theft, etc.

For example, multiple camera videos may be disposed around a vehicle to create a panorama view around the vehicle.

For example, each of the left mirror and the right mirror may comprise an secondary mirror. This secondary mirror may be fixed at a position so that the driver is always able to see a certain fixed FOV. Thus, in one or more embodiments, the secondary mirror is set by the driver, whereas the left mirror and the right mirror may be adjusted in position upon detection of certain object (e.g., a car). Additionally, one of ordinary skill in the art would appreciate that each of the left and the right mirror may comprise a plurality of secondary mirrors. In one or more embodiments, the left mirror, the right mirror, and the secondary mirrors can all rotate to track objects.

Furthermore, one of ordinary skill in the art would appreciate that certain "components," "units," "parts," "elements," "modules," or "portions" of the one or more embodiments of the present invention may be implemented by a circuit, processor, etc., using any known methods. Accordingly, the scope of the disclosure should be limited only by the attached claims.

What is claimed is:

1. A tracking method comprising:
receiving an input from a user or a processor;
detecting, by an image acquisition module, a feature; and
automatically adjusting a mirror to track the feature based on the detecting;
wherein the input is at least one of a right turn signal, a left turn signal, and a reverse signal, and the feature is one selected from the group consisting of a person, an animal, a bicycle, a passenger vehicle, a bus, a train, an airplane, and a combination thereof;
wherein if the input is the reverse signal and the right turn signal, the adjusting adjusts the mirror to track the feature on a left side of the user and adjusts a second mirror to track a second feature on a right side of the user, and if the input is the reverse signal and the left turn signal, the adjusting adjusts the mirror to track the feature on the right side of the user and adjusts the second mirror to track the second feature on the left side of the user.

2. The method according to claim 1 further comprising:
receiving an initial state;
determining that the feature is outside of a field of vision; and
returning the mirror to the initial state.

3. The method according to claim 1, wherein: if the input is the right turn signal, the adjusting adjusts the mirror to track the feature on a right side of the user, and if the input is the left turn signal, the adjusting adjusts the mirror to track the feature on a left side of the user.

4. The method according to claim 1, wherein the second feature is at least one of a line designating a parking space and a curb.

5. The method according to claim 1 further comprising:
capturing images by the image acquisition module, each image comprising the feature;
stitching the images to create a video stream; and
displaying the video stream on a display device.

6. The method according to claim 1 further comprising calculating and displaying a speed of the feature and a distance between the feature and the user on a display device.

7. The method according to claim 1, wherein, if the detecting detects more than one feature, the adjusting adjusts the mirror to track the feature closest to the user.

* * * * *